(12) United States Patent
Hori

(10) Patent No.: US 9,361,931 B2
(45) Date of Patent: Jun. 7, 2016

(54) LIBRARY APPARATUS WITH A LOCKING AND RELEASING SHUTTER MECHANISM

(71) Applicant: FUJITSU LIMITED, Kawasaki-shi, Kanagawa (JP)

(72) Inventor: Daisuke Hori, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/739,030

(22) Filed: Jun. 15, 2015

(65) Prior Publication Data

US 2015/0380044 A1   Dec. 31, 2015

(30) Foreign Application Priority Data

Jun. 25, 2014 (JP) ................................ 2014-130543
Dec. 16, 2014 (JP) ................................ 2014-254400

(51) Int. Cl.
*G11B 15/68* (2006.01)
*G11B 17/22* (2006.01)

(52) U.S. Cl.
CPC ............. *G11B 17/22* (2013.01); *G11B 15/6835* (2013.01); *G11B 17/225* (2013.01)

(58) Field of Classification Search
CPC .......................... G11B 15/6835; G11B 17/225
USPC ................ 360/92.1, 98.06; 369/30.39, 30.43, 369/30.48
See application file for complete search history.

(56) References Cited

U.S. PATENT DOCUMENTS

| | | | | |
|---|---|---|---|---|
| 5,303,214 A | * | 4/1994 | Kulakowski | G11B 17/225 235/385 |
| 5,760,995 A | * | 6/1998 | Heller | G11B 15/6835 360/92.1 |
| 6,488,462 B1 | * | 12/2002 | Williams | G11B 15/6835 198/375 |
| 6,983,469 B2 | * | 1/2006 | Steinhilber | G11B 17/225 369/30.39 |
| 7,016,144 B2 | * | 3/2006 | Yamakawa | G11B 17/225 360/92.1 |
| 2003/0039056 A1 | * | 2/2003 | Satoh | G11B 15/6835 360/92.1 |
| 2004/0017633 A1 | * | 1/2004 | Oohara | G11B 15/6835 360/92.1 |
| 2009/0161250 A1 | * | 6/2009 | Oohara | G11B 15/6835 360/92.1 |
| 2010/0287576 A1 | * | 11/2010 | Terzis | G11B 17/225 720/630 |
| 2013/0322223 A1 | | 12/2013 | Minemura | |
| 2014/0293471 A1 | * | 10/2014 | Sakuma | G11B 15/6835 360/74.1 |

FOREIGN PATENT DOCUMENTS

| | | |
|---|---|---|
| JP | 4-10264 | 1/1992 |
| JP | 2001-126367 | 5/2001 |
| JP | 2013-251020 | 12/2013 |

* cited by examiner

*Primary Examiner* — Jefferson Evans
(74) *Attorney, Agent, or Firm* — Staas & Halsey LLP

(57) ABSTRACT

A library apparatus includes a shutter mechanism including a slide-type shutter configured to open and close the opening and an urging member configured to urge the shutter in a closing direction, and a first locking mechanism configured such that when the running body is stopped at a passing and receiving position of the cartridge, the first locking mechanism permits the shutter in a fully closed state to slide in an opening direction and enables a fully open state of the shutter to be maintained, whereas when the running body is not stopped at the passing and receiving position of the cartridge, the first locking mechanism releases the maintenance of the fully open state of the shutter and prohibits the shutter in the fully closed state from sliding in the opening direction.

9 Claims, 26 Drawing Sheets

LIBRARY APPARATUS WITH A LOCKING AND RELEASING SHUTTER MECHANISM

CROSS-REFERENCE TO RELATED APPLICATION

This application is based upon and claims the benefit of priority of the prior Japanese Patent Application No. 2014-254400, filed on Dec. 16, 2014, and the prior Japanese Patent Application No. 2014-130543, filed on Jun. 25, 2014, the entire contents of which are incorporated herein by reference.

FIELD

The embodiments discussed herein are related to techniques that secure the safety of a worker who performs maintenance in a library apparatus used for applications including data backup.

BACKGROUND

In order to back up a large amount of data safely and easily, library apparatuses including a cabinet are being put into practical use, the cabinet housing a cartridge that records data, a drive that reads and writes data, and a robot that transports the cartridge to the drive. Some library apparatuses allow plural cabinets to be connected to prepare for the case where a large storage capacity is desirable due to increase of data. In this case, in addition to a robot that operates in each cabinet, a transport mechanism is provided that transports a cartridge between the cabinets. The transport mechanism includes, for example, a base member that penetrates plural cabinets, a cart that runs on the upper surface of the base member, and a cover that covers around the base member. The cover has an opening through which a cartridge is passed or received to or from the cart. These techniques are disclosed in Japanese Laid-open Patent Publication No. 2001-126367.

In a library apparatus in which a plurality of cabinets are connected, when a failure occurs in a certain cabinet, maintenance work is sometimes performed under the condition that only the certain cabinet is deactivated and the other cabinets and the transport mechanism are in operation. In this case, a worker performs maintenance work in the cabinet in which a failure has occurred, and for example, when the worker places a hand on the opening of the transport mechanism to support his or her body, the hand may come into contact with a cart that runs inside the transport mechanism.

SUMMARY

According to an aspect of the invention, a library apparatus including a plurality of cabinets and a transport mechanism, the cabinets being connected to each other and each housing a robot that handles a cartridge that records data, the transport mechanism being configured to allow the cartridge to be passed or received to or from a running body via an opening formed in a cylindrical path and to be transported between the cabinets, the cylindrical path extending in a direction of the connection of the cabinets, the running body being operable to run along the path, the library apparatus includes a shutter mechanism including a slide-type shutter configured to open and close the opening and an urging member configured to urge the shutter in a closing direction, and a first locking mechanism configured such that when the running body is stopped at a passing and receiving position of the cartridge, the first locking mechanism permits the shutter in a fully closed state to slide in an opening direction and enables a fully open state of the shutter to be maintained, whereas when the running body is not stopped at the passing and receiving position of the cartridge, the first locking mechanism releases the maintenance of the fully open state of the shutter and prohibits the shutter in the fully closed state from sliding in the opening direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments for implementing the present disclosure will be described in detail with reference to the accompanying drawings.

Figure 1:
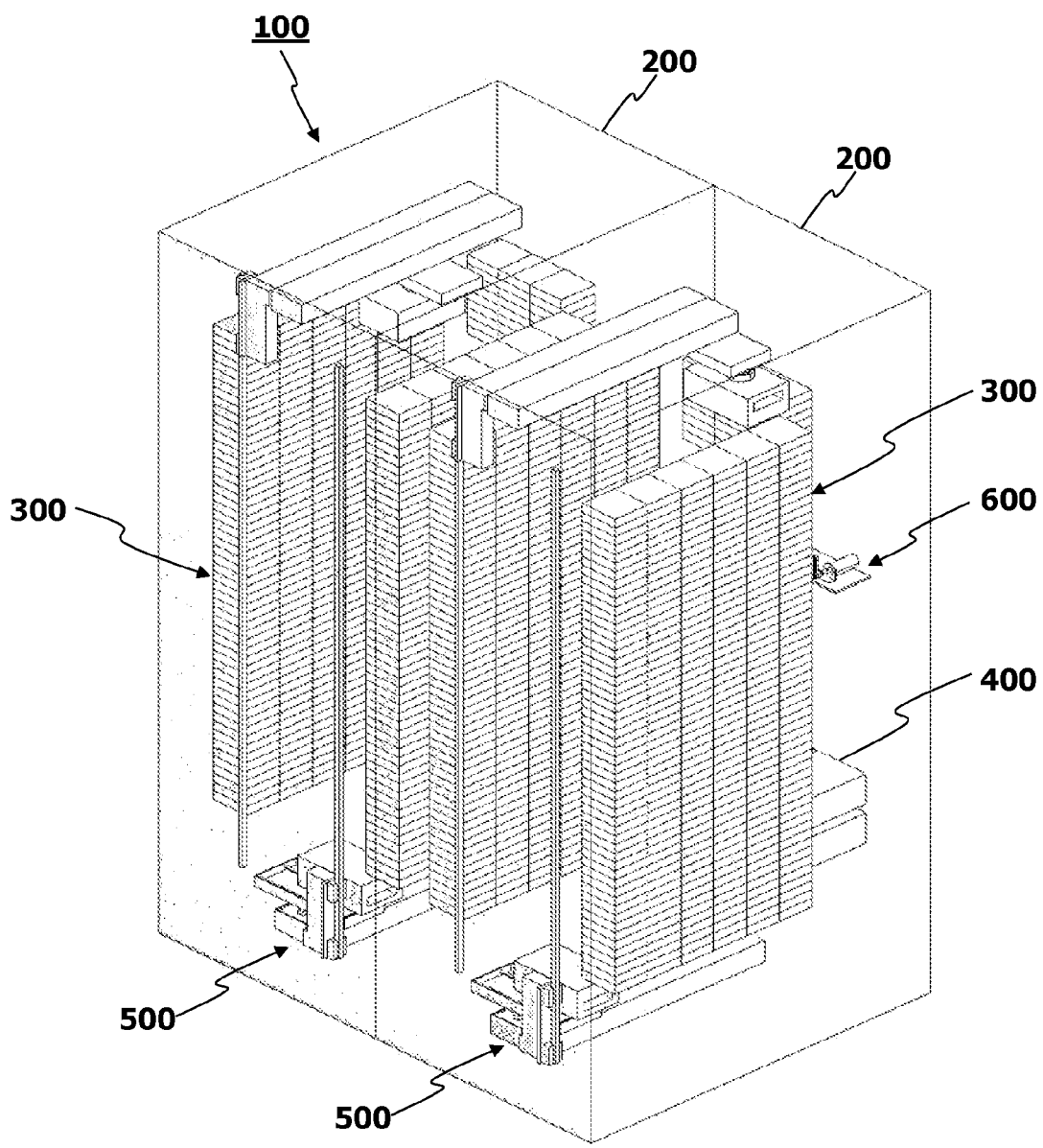
FIG. 1 is a diagonal front perspective view illustrating an example library apparatus.
Figure 2:
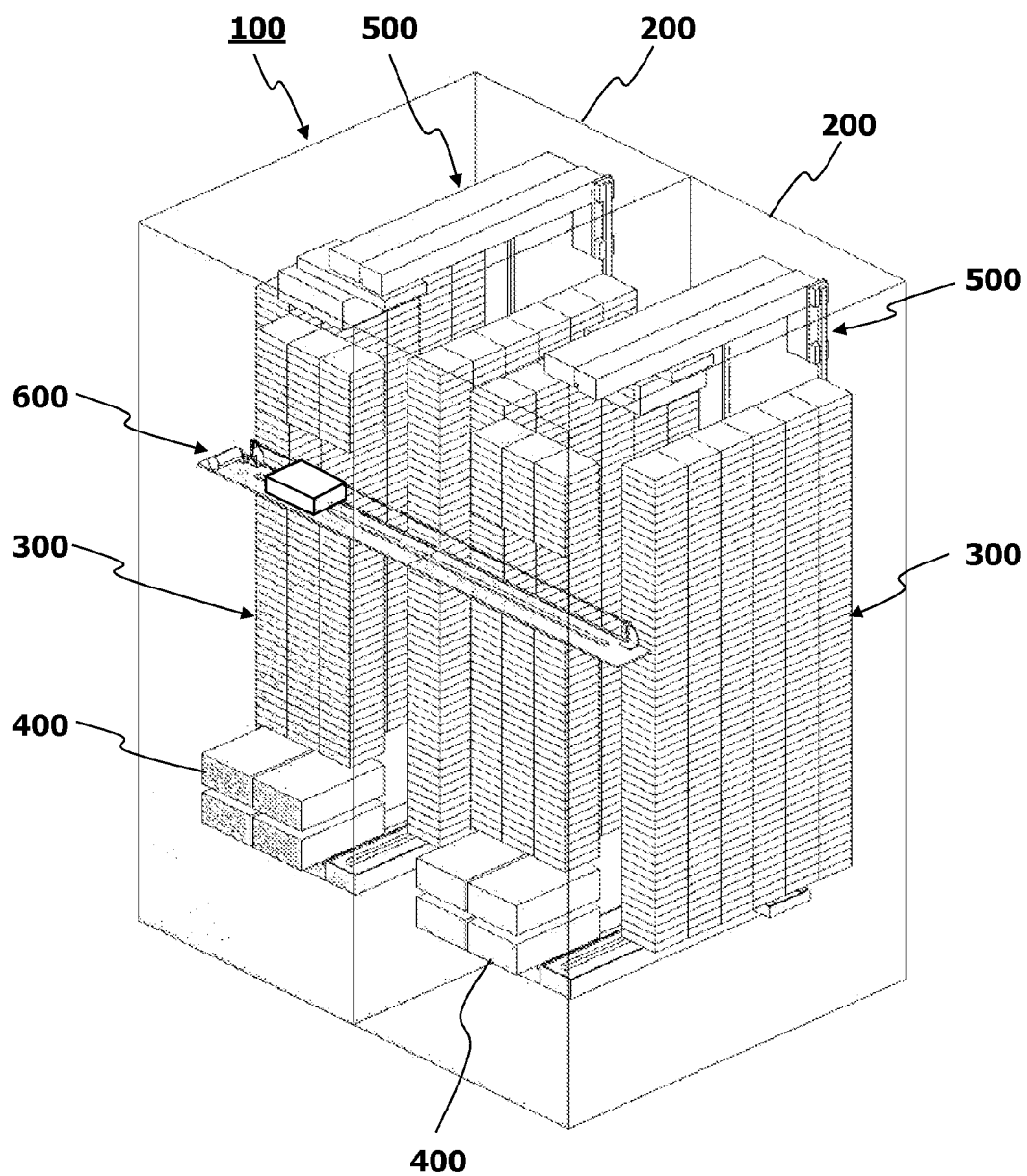
FIG. 2 is a diagonal rear perspective view illustrating the example library apparatus.

FIGS. 1 and 2 illustrate an example library apparatus 100.

The library apparatus 100 is constructed by connecting a plurality of cabinets 200, each of which has a substantially rectangular parallelepiped shape and houses at least, a cartridge that records data, a drive that reads and writes data, and a robot that handles the cartridge. The library apparatus 100, in which two cabinets 200 are connected, are described herein. However, three or more cabinets 200 may be connected. Also, a publicly known portable recording medium may be used as the cartridge, for example, the portable recording medium includes a magnetic tape cartridge and an optical disk cartridge.

Two cartridge access stations (CAS) (not illustrated) for loading and unloading a cartridge to or from the library apparatus 100 are mounted on the front face of each of the cabinets 200. Each CAS allows cartridges to be loaded and unloaded in magazines each of which houses a predetermined number of cartridges.

Figure 3:
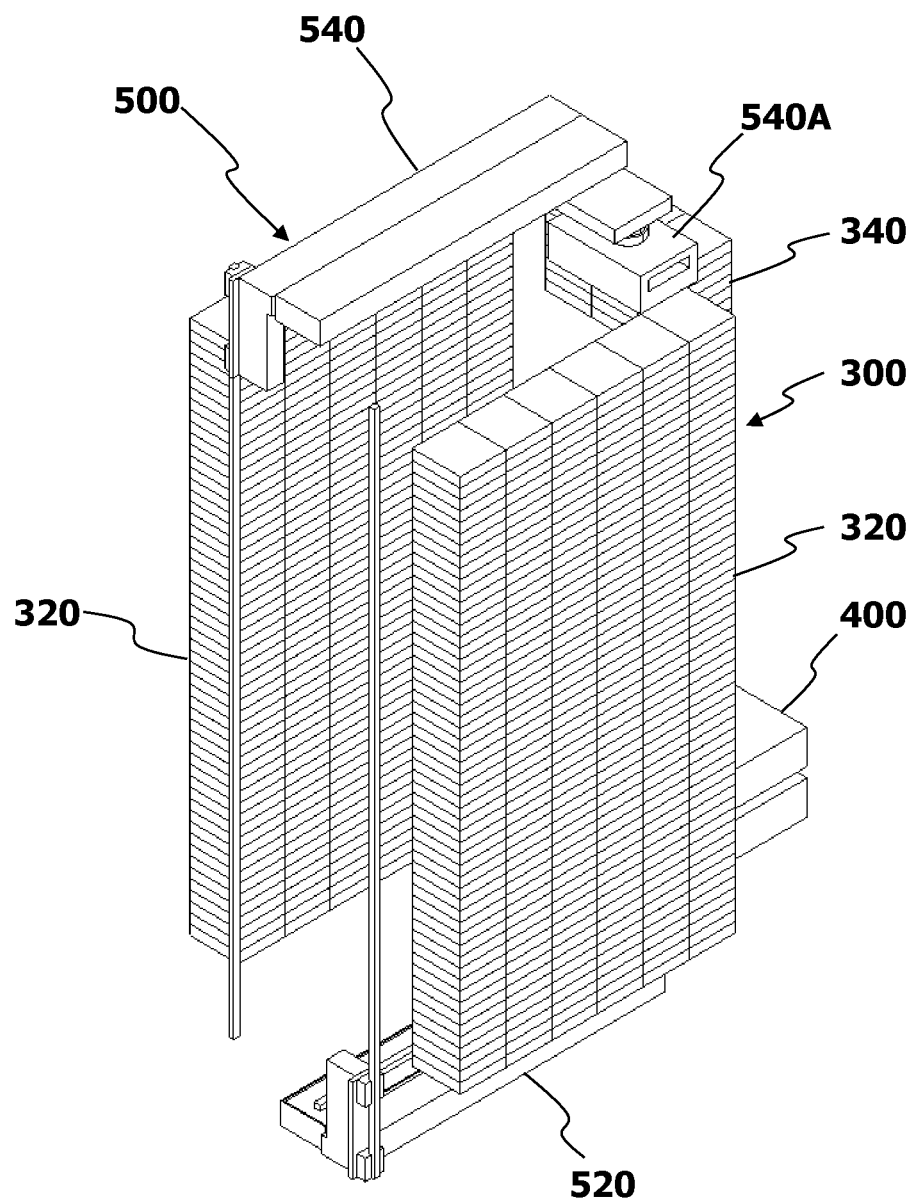
FIG. 3 is a perspective view illustrating an example internal structure of a cabinet.
Figure 4:
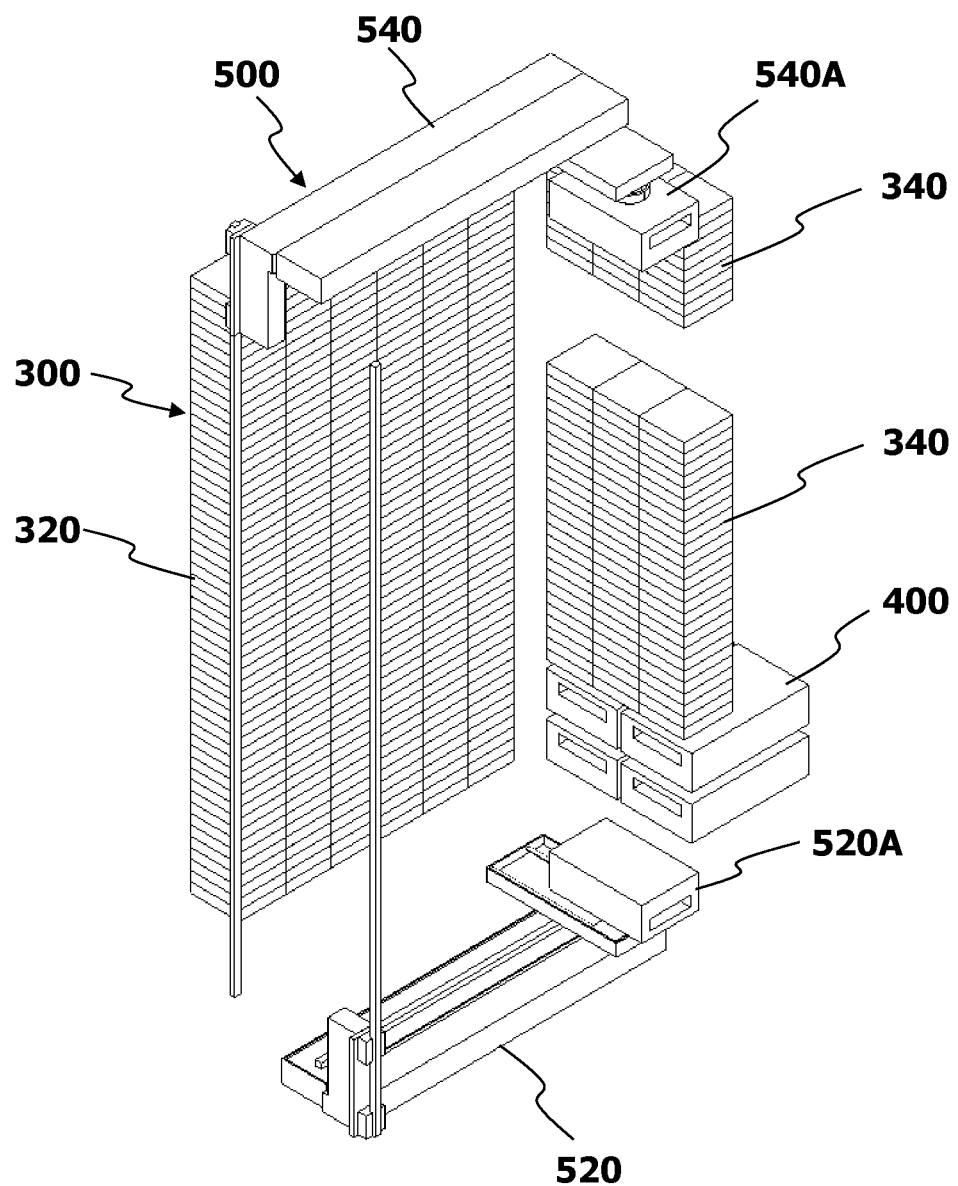
FIG. 4 is a perspective view illustrating an example internal structure of the cabinet.

As illustrated in FIGS. 3 and 4, the cabinet 200 internally houses a cell 300 having slots that removably store many cartridges, a drive 400 that reads and writes data from and to the cartridges, and a robot 500 that handles the cartridges.

In order to house cartridges as many as possible, the cell 300 includes for example, a pair of right and left side cells 320 that are disposed on both lateral sides in a width direction of the cabinet 200, and a back cell 340 that is disposed on the back side in a depth direction of the cabinet 200. The back cell 340 has a two-division structure in which the back cell 340 is divided at a point in a vertical direction to ensure the installation space for a transport mechanism 600, which is described below. Here, when the side cells 320 and the back cell 340 may not be distinguished from each other, each cell is referred to as "cell 300".

Four sets of the drive 400 are mounted in an array below the back cell 340 so that data backup is performed without a hitch, for example, at the occurrence of a failure. It is to be noted that the number of the drives 400 is not limited to four and any number of the drives 400 may be mounted.

Figure 5:
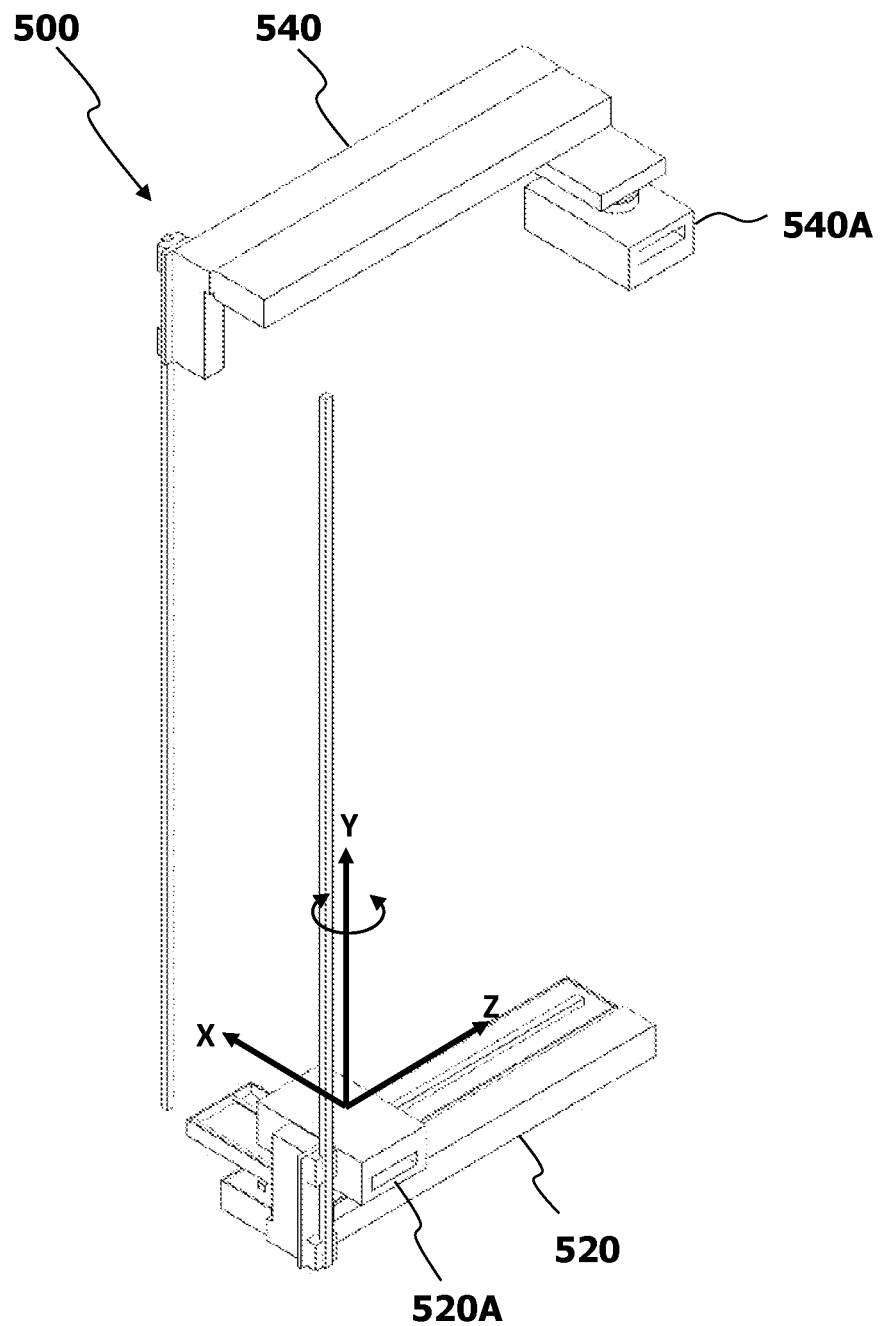
FIG. 5 is a perspective view illustrating an example robot.

The robot 500 includes a first robot 520 mounted on the lower surface of the cabinet 200, and a second robot 540 mounted on the upper surface of the cabinet 200 so that data backup is performed without a hitch, for example, at the occurrence of a failure. As illustrated in FIG. 5, the first robot 520 and the second robot 540 have respective hands 520A and 540A that are rotatable around the Y-axis and movable in the X-axis extending in a width direction, the Y-axis extending in a vertical direction, and the Z-axis extending in a depth direction of the cabinet 200. In response to a command from a higher-level control apparatus (not illustrated), the first robot 520 and the second robot 540 operate properly. It is to be noted that only one set of the robot 500 or three or more sets of the robot 500 may be provided. Here, when the first robot 520 and the second robot 540 may not be distinguished from each other, each robot is referred to as "robot 500". In this case, the hand of the robot 500 is referred to as the "hand 500A".

The two cabinets 200 that constitute the library apparatus 100 are provided with a transport mechanism 600 that transports a cartridge between the cabinets 200. The transport mechanism 600 extends in the connection direction of the two cabinets 200, that is, in the width direction of the two cabinets 200, and is disposed at the division point of the back cell 340 of the cell 300. Therefore, the transport mechanism 600 penetrates through a connection portion between the cabinets 200.

Figure 6A:
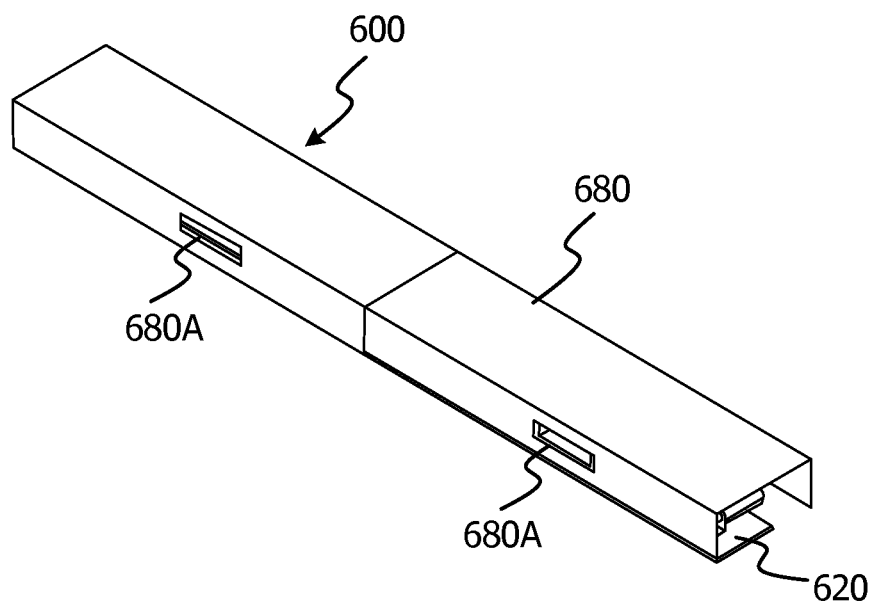
FIG. 6A is a perspective view of a transport mechanism in its entirety.
Figure 6B:
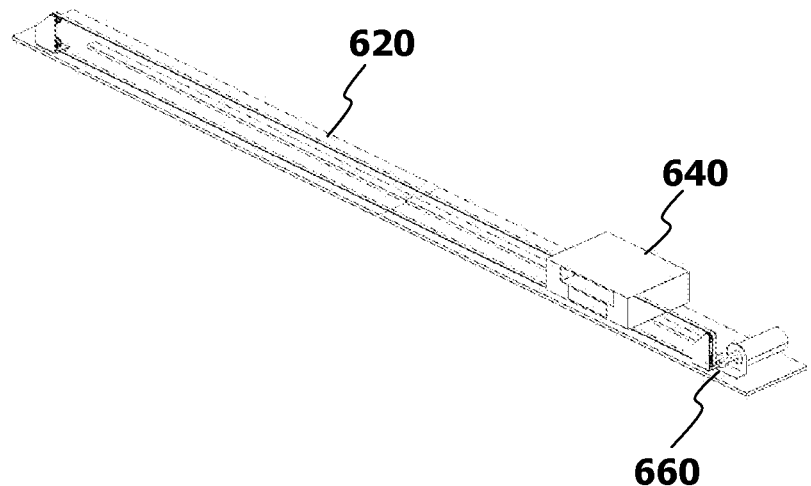
FIG. 6B is a perspective view of the internal structure of the transport mechanism.

As illustrated in FIGS. 6A and 6B, the transport mechanism 600 includes a base member 620 that extends between the cabinets 200, a cart 640 that runs on the upper surface of the base member 620, a drive mechanism 660 that causes the cart 640 to run, and a cover 680 that covers around the base member 620. Here, the cart 640 is given as an example of a running body. Also, a cylindrical member formed by the base member 620 and the cover 680 is given as an example of a cylindrical path.

The base member 620 is formed of a substantially rectangular plate member having a surface located on a level surface, and is disposed so that the long side of the base member 620 extends in the width direction of the cabinets 200. Here, the level surface is the surface that is defined by the width direction and the depth direction of the cabinets 200 (hereinafter the same definition is applied).

Figure 7:
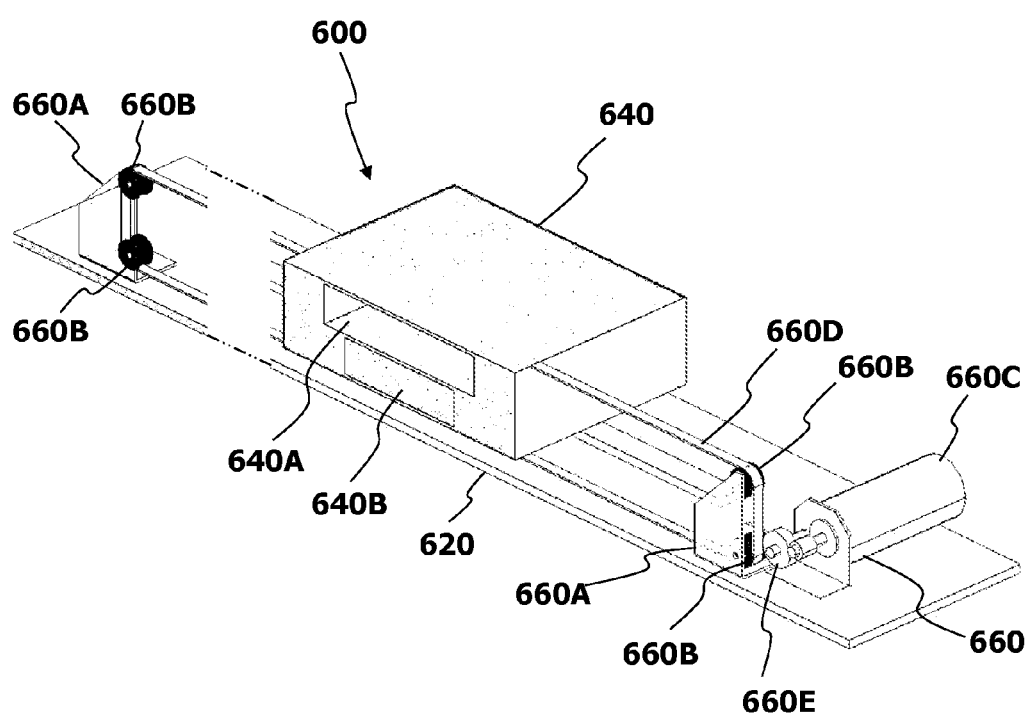
FIG. 7 is a perspective view illustrating details of an example transport mechanism.

As illustrated in FIG. 7, the cart 640 has a substantially rectangular parallelepiped shape and includes an opening 640A and a relative flag 640B respectively formed in and attached to a lateral face of the cart 640, the lateral face being parallel to the longitudinal direction of the base member 620, the opening 640A removably holding a cartridge, the relative flag 640B for detecting the position of the robot 500. In addition, each of the four corners of the lower portion of the cart 640 is provided with a tire 640C (see FIGS. 13A to 18B) that is in contact with the upper surface of the base member 620 and rotates.

The drive mechanism 660 includes brackets 660A fixed at both longitudinal ends of the base member 620, a pair of upper and lower pulleys 660B attached to each of the brackets 660A, an electric motor 660C, and a timing belt 660D. Each bracket 660A is formed of a substantially L-shaped plate member in side view and has a vertically extending portion to which a pair of upper and lower pulleys 660B is rotatably attached. Here, the upper and lower pulleys 660B are substantially flush with the upper surface and the lower surface of the cart 640, respectively. The electric motor 660C is, for example, a servo motor and rotates the pulley 660B via a gear 660E, the gear 660E functioning as a reducer, the pulley 660B being the lower pulley at a longitudinal end of the base member 620. The timing belt 660D is stretched over four pulleys 660B, and, for example, part of the timing belt 660D is fixed to the upper surface of the cart 640. Therefore, when the electric motor 660C is rotated, one pulley 660B is rotated via the gear 660E and the timing belt 660D moves, and thus the cart 640 integrated with the timing belt 660D may be driven along a predetermined path.

The cover 680 is a member that protects a worker from the cart 640 that runs on the upper surface of the base member 620, and is formed of a substantially channel-shaped (angular U-shaped) plate member that covers, for example, the front side, the upper side, and the rear side of the base member 620. Here, the cover 680 has a size that allows the cart 640 to run on the upper surface of the base member 620. An opening 680A, through which a cartridge is passed or received to or from the opening 640A of the cart 640, is formed in the front face of the cover 680 at a predetermined position (passing and receiving position for a cartridge) of each cabinet 200. The opening 680A has a size that allows a cartridge to pass therethrough. It is sufficient that the cover 680 be able to cover around the base member 620 by cooperation with various members stored in the cabinet 200.

Figure 8A:
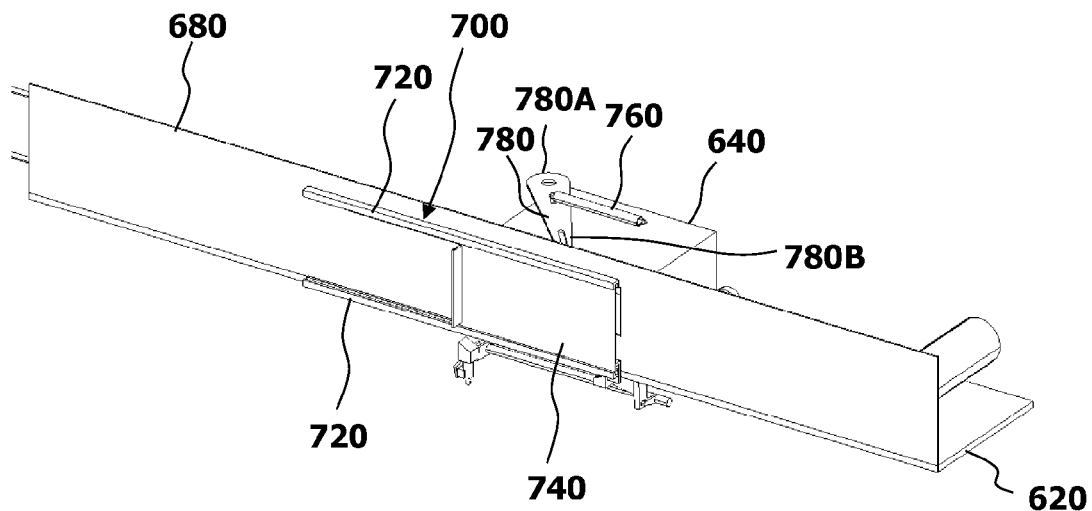
FIG. 8A is a perspective view of a shutter mechanism in a fully closed state.
Figure 8B:
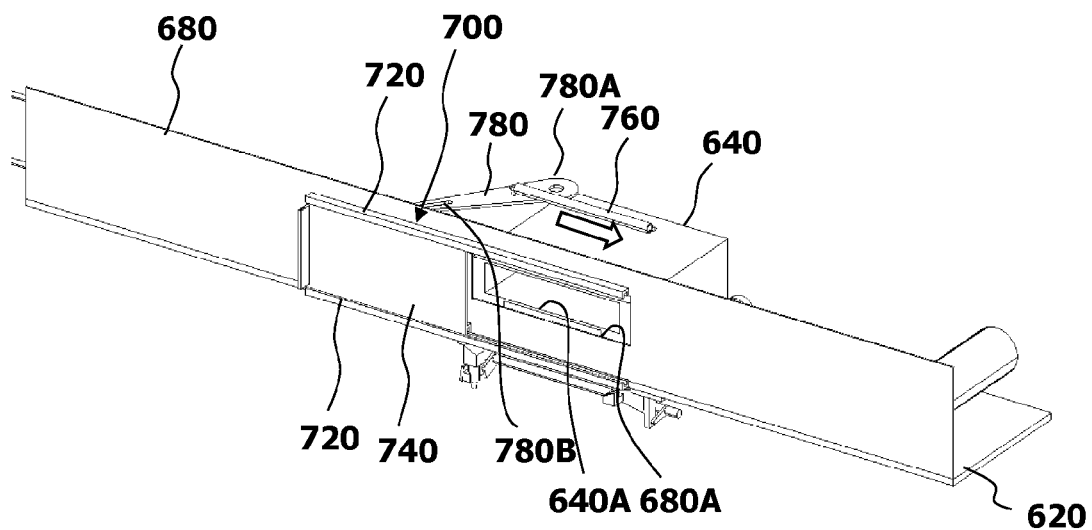
FIG. 8B is a perspective view of the shutter mechanism in a fully open state.

As illustrated in FIGS. 8A and 8B, a shutter mechanism 700, which opens and closes the opening 680A, is mounted on the front face of the cover 680. The shutter mechanism 700 includes a pair of upper and lower guide rails 720 that extends in parallel to the longitudinal direction of the cover 680, a shutter 740 that is slidably attached to the pair of upper and lower guide rails 720, and a tension coil spring 760 that urges the shutter 740 in a closing direction. Here, the tension coil spring 760 is given as an example of an urging member.

Figure 9:
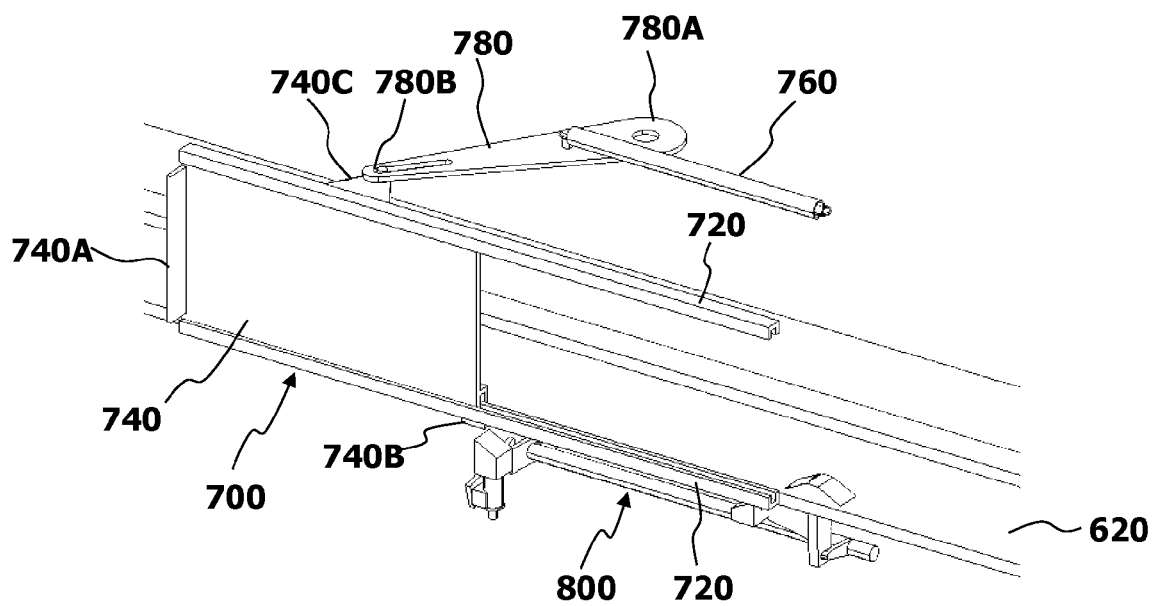
FIG. 9 is a perspective view illustrating details of an example shutter mechanism.

The pair of upper and lower guide rails 720 is a substantially channel-shaped member having opposed sides each having an opening, and the upper and lower guide rails 720 are respectively fixed above and below the opening 680A of the cover 680. The shutter 740 is formed of a substantially rectangular plate member and is slidably fitted in a depressed portion of the pair of upper and lower guide rails 720. As illustrated in FIG. 9, the shutter 740 includes a projection portion 740A so as to allow the robot 500 to slide the shutter 740 in an opening direction, the projection portion 740A being formed by bending one longitudinal end of the shutter 740 at a substantially right angle, for example. A substantially rectangular retaining portion 740B is provided integrally with the shutter 740 below the rear side of the other longitudinal end of the shutter 740, the retaining portion 740B straddling over the lower located guide rail 720 and projecting downward to maintain (lock) the shutter 740 in a fully closed state or in a fully open state by a first locking mechanism 800, which is described below. In addition, a substantially triangular projection portion 740C is provided integrally with the shutter 740 on the rear side of the shutter 740, the projection portion 740C extending toward the rear side via a slit (not illustrated) extending horizontally in the longitudinal direction of the cover 680. It is to be noted that the projection portion 740A may be a handle (knob) that projects from the shutter 740.

A base end 780A of a lever 780, which is formed of a plate member, is mounted on the cover 680 rotatably around a vertically extending rotation shaft. A tip end 780B of the lever 780 has a long hole that extends along a straight line through the rotation shaft, and the projection portion 740C of the shutter 740 is relatively movably pin-connected to the long hole. The tip end of the tension coil spring 760 is fixed to a middle portion of the lever 780. The base end of the tension coil spring 760 is fixed to the cover 680. Therefore, the tension coil spring 760 urges the shutter 740 via the lever 780 in the closing direction all the time, and thus the opening 680A of the cover 680 is not exposed to the outside and safety of a maintenance worker of the library apparatus 100 may be improved, for example.

Figure 10:
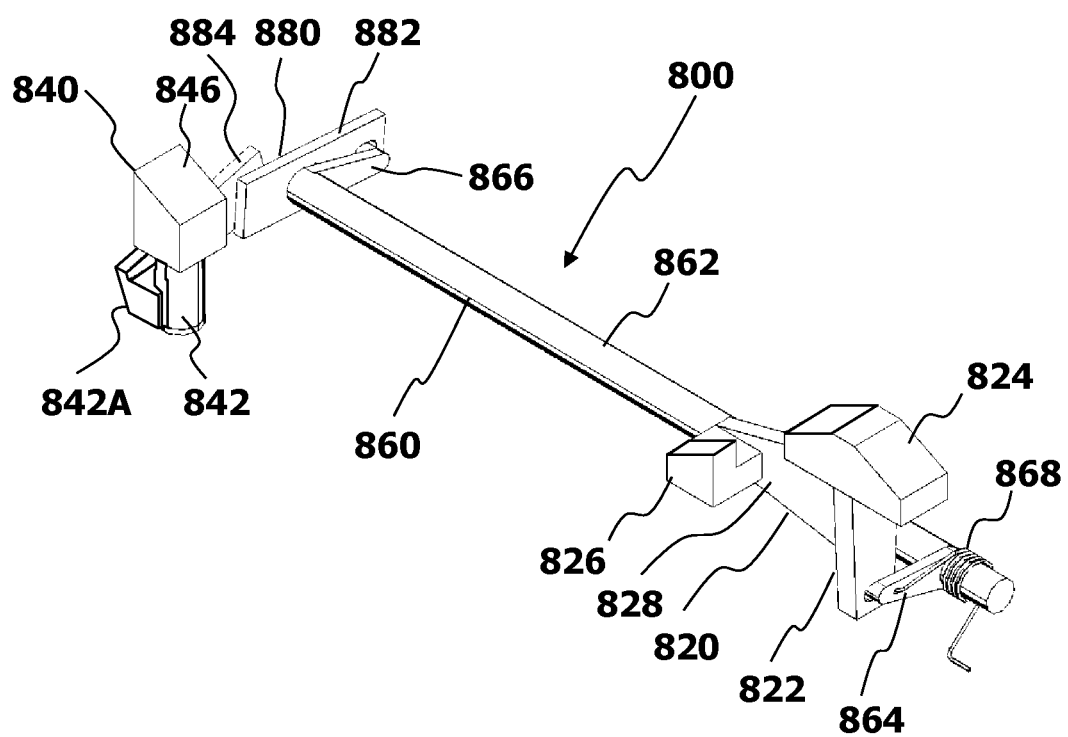
FIG. 10 is a perspective view illustrating an example first locking mechanism.

Since the shutter 740 of the shutter mechanism 700 is urged in the closing direction by the tension coil spring 760, for example, when a worker places a hand on the shutter 740 unconsciously, the shutter 740 may be opened against the urging force of the tension coil spring 760. Thus, the shutter mechanism 700 is provided with a mechanical first locking mechanism 800 illustrated in FIGS. 9 and 10.

The first locking mechanism 800 prohibits or permits sliding of the shutter 740 in the opening direction from the fully closed state according to whether or not the cart 640 of the transport mechanism 600 is stopped at a predetermined position, that is, the position at which the opening 640A of the cart 640 is aligned with the opening 680A of the cover 680. In addition, when the cart 640 is stopped at the predetermined position, the first locking mechanism 800 enables the fully open state of the shutter 740 to be maintained.

The first locking mechanism 800 includes a first block 820 that is depressed by one of the tires 640C of the cart 640, a second block 840 that holds the shutter 740 in the fully open state, a shaft 860 that transmits force for vertically moving the second block 840, and a link 880 that converts motion.

The first block 820 includes a penetration portion 822 that movably penetrates the base member 620 vertically, a depression portion 824 fixed to the upper end of the penetration portion 822, a lock portion 826 that is retained to the retaining portion 740B of the shutter 740, and a connection portion 828 that connects the penetration portion 822 and the lock portion 826. The penetration portion 822 has a substantially rectangular parallelepiped shape and is vertically movably fitted in a substantially rectangular through hole formed in the base member 620. The depression portion 824 has a substantially rectangular parallelepiped shape having an upper face in a triangular shape, a trapezoidal shape, or a circular shape in the longitudinal direction of the base member 620, and is fixed to the upper end of the penetration portion 822. The lock portion 826 has a substantially rectangular parallelepiped shape having the upper face that is gradually inclined downward away from the penetration portion 822. The lock portion 826 is disposed substantially parallel to the front face of the cover 680 of the transport mechanism 600. The connection portion 828 has a substantially triangular shape in side view and connects the penetration portion 822 and the lock portion 826. When the cart 640 is stopped at a predetermined position, the depression portion 824 is placed at a position where the depression portion 824 is depressed by one of the four tires 640C. When the shutter 740 is in the fully closed state, the lock portion 826 is retained to one lateral face of the retaining portion 740B of the shutter 740, and is disposed at a position to lock sliding of the shutter 740 in the opening direction.

Figure 11A:
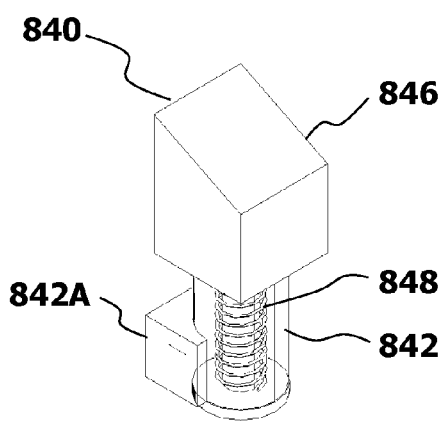
FIG. 11A is a perspective view of a holding portion of a second block in a state where the retainer is extended.
Figure 11B:
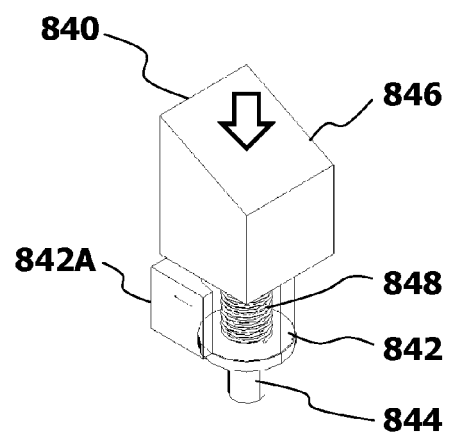
FIG. 11B is a perspective view of the holding portion of the second block in a state where the retainer is retracted.

As illustrated in FIGS. 11A and 11B, the second block 840 includes a closed-end cylindrical main body 842 having an open upper face, a shaft portion 844 that is vertically movably fitted in a through hole (not illustrated) formed in the bottom face of the main body 842, a holding portion 846 fixed to the upper end of the shaft portion 844, and a compression coil spring 848. A flat portion 842A is formed on the peripheral wall of the main body 842, the flat face 842A serving as a mounting portion to the link 880. The holding portion 846 has a substantially rectangular parallelepiped shape having the upper face that is gradually inclined downward closer to the first block 820. The compression coil spring 848 is disposed between the inner circumferential surface of the main body 842 and the outer circumferential surface of the shaft portion 844, and urges the holding portion 846 upward (in the opening direction). Therefore, as illustrated in FIG. 11B, the holding portion 846, when being pressed in the direction to the bottom face, is able to move downward against the urging force of the compression coil spring 848. When the shutter 740 is set in the fully open state, the holding portion 846 is retained to one lateral face of the retaining portion 740B of the shutter 740 and is placed at a position to maintain the fully open state of the shutter 740. Here, the compression coil spring 848 is given as an example of an urging member that urges the second block upward.

The shaft 860 includes a shaft portion 862 that is disposed parallel to the opening and closing direction of the shutter 740, and first lever 864 and second lever 866 that are respectively integral with both ends of the shaft portion 862. The first lever 864 and the second lever 866 extend outward in opposite directions with respect to the axis of the shaft portion 862, that is, directions with a rotation phase difference of 180 degrees. The tip end of the first lever 864 is relatively rotatably connected to a lower portion of the penetration portion 822 of the first block 820 via pin connection. Here, a connection portion between the penetration portion 822 of the first block 820 and the tip end of the first lever 864 may be a long hole to permit some relative displacement. Also, a torsion coil spring 868 is mounted around the base end of the first lever 864 to urge the depression portion 824 of the first block 820 upward, the torsion coil spring 868 for causing the shaft portion 862 to rotate in a predetermined rotation direction. Here, the torsion coil spring 868 is given as an example of an urging member that urges the first block upward.

The link 880 includes substantially rectangular first plate member 882 and second plate member 884, and one ends of the first plate member 882 and the second plate member 884 are relatively rotatably pin-connected. Then a middle portion of the first plate member 882 and a middle portion of the second plate member 884 are rotatably fixed to the periphery of different rotation axes that are substantially parallel to the axis of the shaft portion 862 of the shaft 860. The other end of the first plate member 882 is relatively rotatably pin-connected to the tip end of the second lever 866 of the shaft 860, and the other end of the second plate member 884 is relatively rotatably pin-connected to the flat portion 842A of the main body 842 of the second block 840. Here, the other ends of the first plate member 882 and the second plate member 884 may be a long hole to permit some relative displacement between the shaft 860 and the second block 840.

The operation of the first locking mechanism 800 will be described below.

Figure 12:
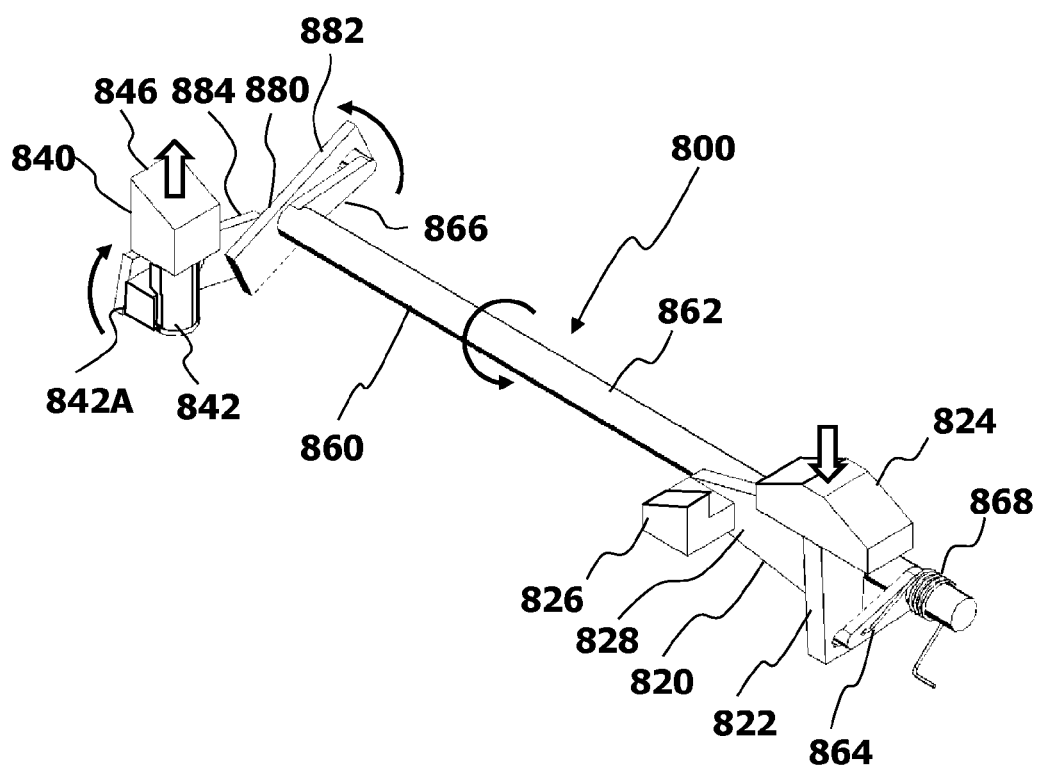
FIG. 12 is a perspective view for explaining an operation of the first locking mechanism.

When the cart 640 of the transport mechanism 600 is stopped at a predetermined position, as illustrated in FIG. 12, one tire 640C of the cart 640 depresses the depression portion 824 of the first block 820 downward against the urging force of the torsion coil spring 868. When the depression portion 824 is depressed downward, the lock portion 826 integral with the depression portion 824 moves downward to release the retaining portion 740B of the shutter 740 from the lock portion 826, and thus the shutter 740 in the fully closed state is permitted to slide in the opening direction. Also, when the depression portion 824 is depressed downward, the shaft portion 862 of the shaft 860 rotates in the direction of the arrow via the first lever 864 which is relatively rotatably connected to a lower portion of the penetration portion 822.

When the second lever 866 rotates in the direction of the arrow along with the rotation of the shaft portion 862, the first plate member 882 rotates counterclockwise. When the first plate member 882 rotates counterclockwise, the second plate member 884 connected to the tip end of the first plate member 882 rotates clockwise. Then, since the other end of the second plate member 884 is connected to the second block 840, the holding portion 846 moves upward. In this condition, since the upper surface of the holding portion 846 is an inclined surface, along with sliding of the shutter 740 in the opening direction, the retaining portion 740B of the shutter 740 depresses the holding portion 846 downward against the urging force of the compression coil spring 848, and the retaining portion 740B crosses over the holding portion 846. Then, the holding portion 846 is retained to the retaining portion 740B, and the shutter 740 may be maintained in the fully open state.

When the cart 640 of the transport mechanism 600 is moved from a predetermined position, an external force depressing down the depression portion 824 of the first block 820 is released, and thus the urging force of the torsion coil spring 868 causes the shaft portion 862 of the shaft 860 to rotate in the opposite direction (clockwise rotation) to the direction in FIG. 12. Then, the first lever 864 integral with the shaft portion 862 rotates clockwise, and the depression portion 824 connected to the tip end of the first lever 864 moves upward. Along with the upward movement of the depression portion 824, the lock portion 826 integral with the depression portion 824 also moves upward and preparation for locking the shutter 740 in the fully closed state is completed.

When the shaft portion 862 rotates clockwise, the second lever 866 integral with the shaft portion 862 also rotates clockwise, and the second block 840 moves downward due to the function of the link 880 connected to the tip end of the second lever 866. When the second block 840 moves downward, the holding portion 846 is released from the retaining portion 740B of the shutter 740, and the urging force of the tension coil spring 760 of the shutter mechanism 700 causes the shutter 740 to start to slide in the closing direction. When the shutter 740 is in nearly the fully closed state, the retaining portion 740B of the shutter 740 comes into contact with the inclined surface of the lock portion 826 of the first block 820, thereby causing the first block 820 to move downward against the urging force of the torsion coil spring 868. When the first block 820 moves downward, as described above, the shaft portion 862 of the shaft 860 rotates counterclockwise, which does not cause any problem because the fully open state of the shutter 740 maintained by the second block 840 has been released. When the retaining portion 740B of the shutter 740 crosses over the lock portion 826, the lock portion 826 is retained to the retaining portion 740B so that the shutter 740 is maintained in the fully closed state.

In this manner, when the cart 640 is stopped at a predetermined position, the first locking mechanism 800 disables the function of locking the shutter 740 in the fully closed state and enables the function of maintaining the shutter 740 in the fully open state. On the other hand, when the cart 640 is moved from the predetermined position, the first locking mechanism 800 disables the function of maintaining the shutter 740 in the fully open state and enables the function of locking the shutter 740 in the fully closed state.

Next, the operation of the library apparatus 100 will be described.

Figure 13A:
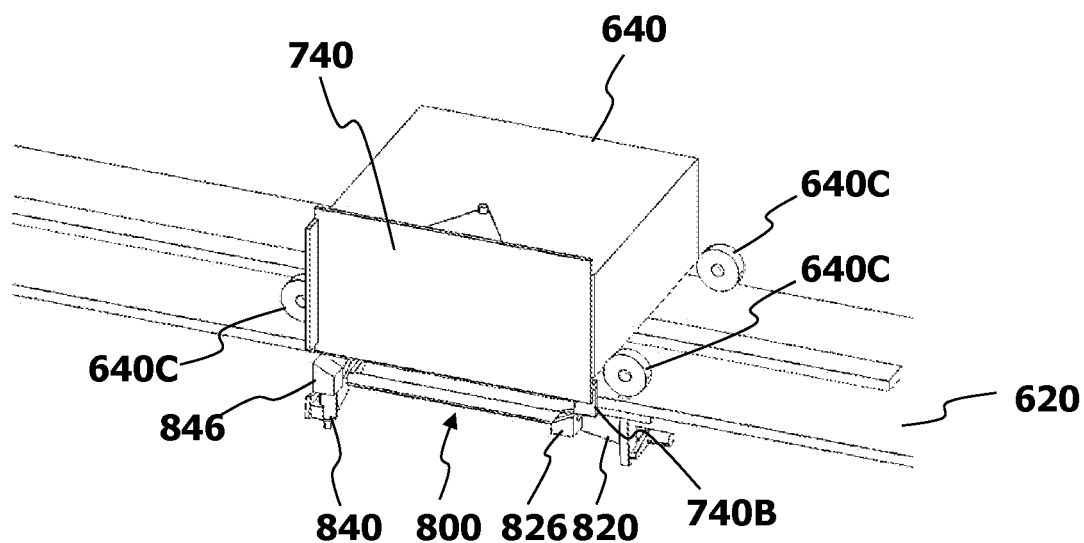
FIG. 13A is a perspective view illustrating a first process of the operation of the library apparatus, and states of the transport mechanism and the first locking mechanism.
Figure 13B:
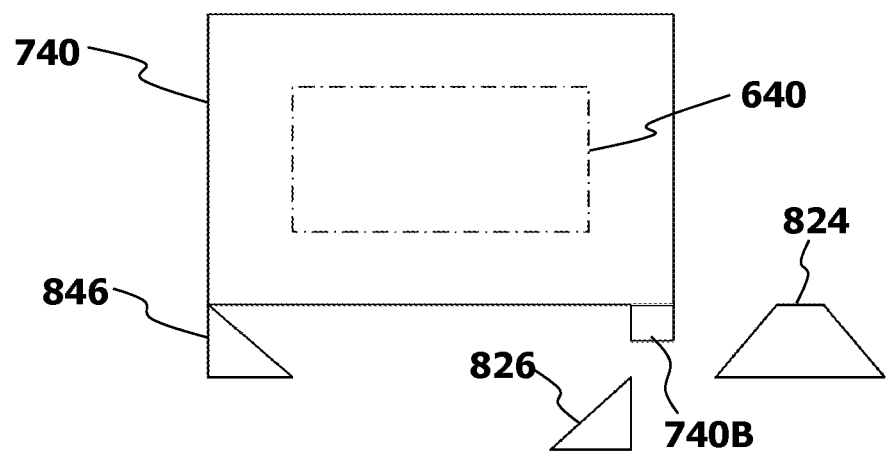
FIG. 13B is a schematic diagram illustrating the first process of the operation of the library apparatus, and states of main members of the first locking mechanism.

When the cart 640 is stopped at a predetermined position to transport a cartridge between the cabinets 200 as illustrated in FIG. 13A, the cart 640 depresses the depression portion 824 of the first block 820 downward as illustrated in FIG. 13B. When the first block 820 is depressed downward, the lock portion 826 is also moved downward and is released from the retaining portion 740B of the shutter 740, and thus the shutter 740 in the fully closed state is allowed to slide in the opening direction. Along with the downward depression of the first block 820, the holding portion 846 of the second block 840 moves upward.

Figure 14A:
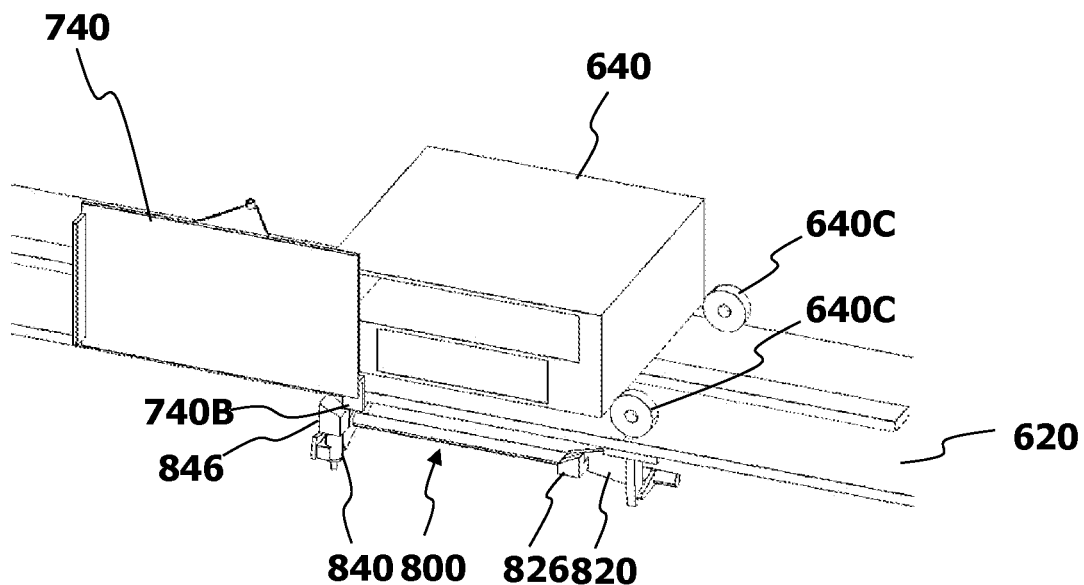
FIG. 14A is a perspective view illustrating a second process of the operation of the library apparatus, and states of the transport mechanism and the first locking mechanism.
Figure 14B:
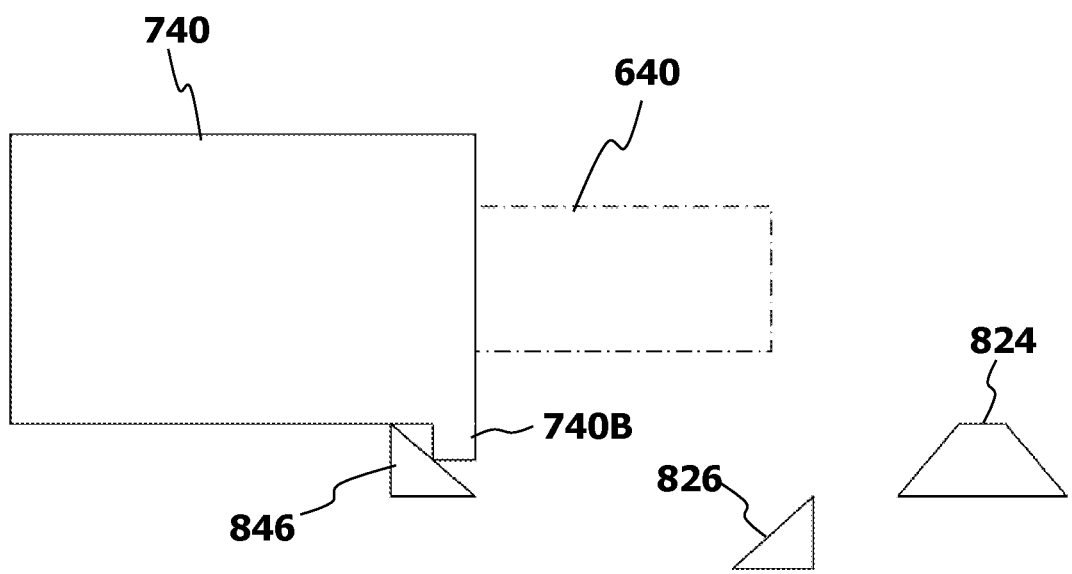
FIG. 14B is a schematic diagram illustrating the second process of the operation of the library apparatus, and states of the main members of the first locking mechanism.

In this condition, the hand 500A of the robot 500 is moved to a position immediately before the shutter 740 and operated in the X-axis direction, and the projection portion 740A of the shutter 740 is held by the hand 500A and is caused to slide in the opening direction as illustrated in FIG. 14A. In this process, when the shutter 740 is in nearly the fully open state, the retaining portion 740B of the shutter 740 comes into contact with the inclined surface of the holding portion 846 of the second block 840 as illustrated in FIG. 14B.

Figure 15A:
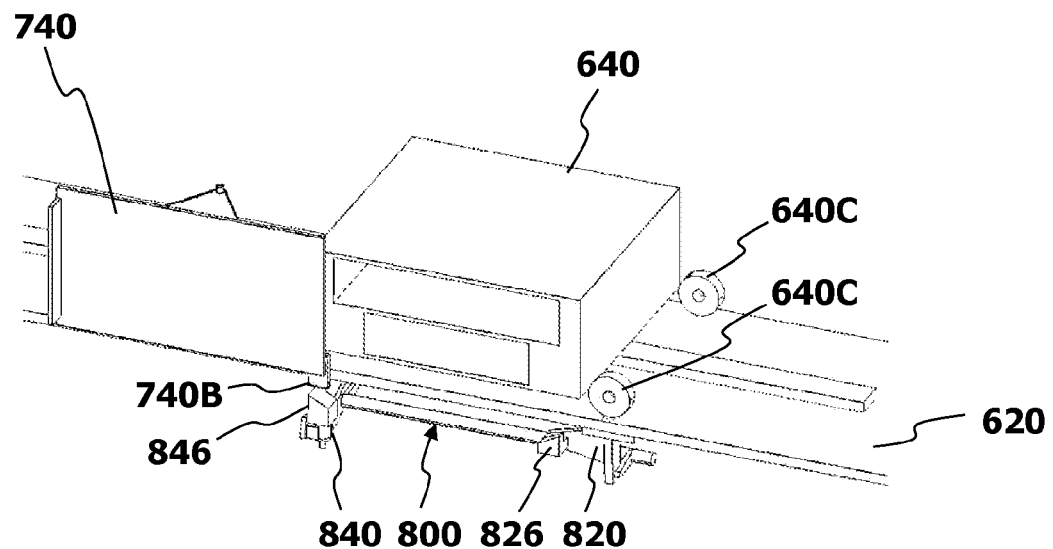
FIG. 15A is a perspective view illustrating a third process of the operation of the library apparatus, and states of the transport mechanism and the first locking mechanism.
Figure 15B:
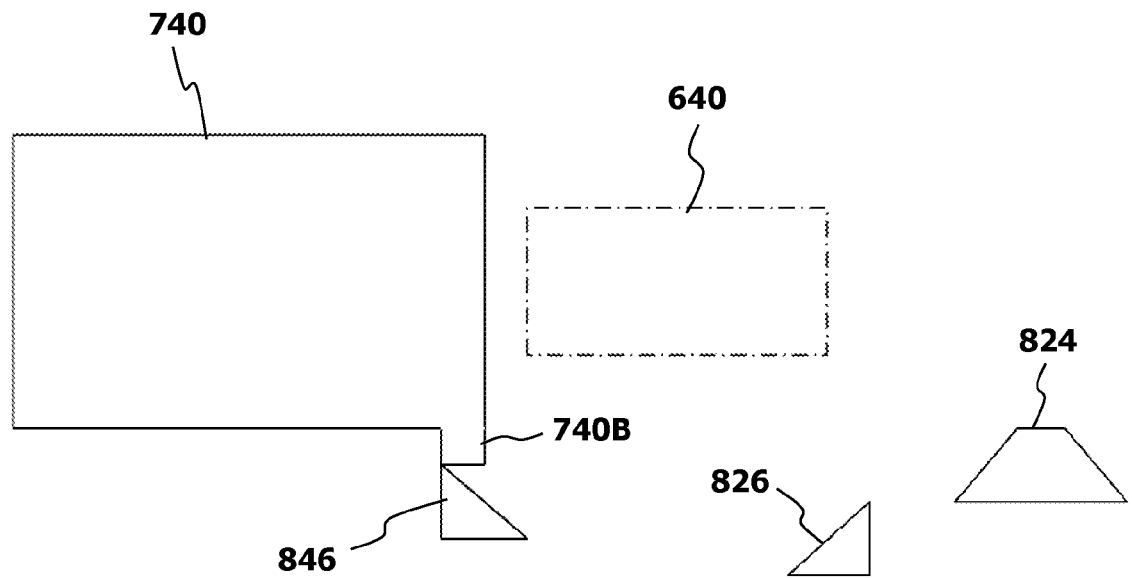
FIG. 15B is a schematic diagram illustrating the third process of the operation of the library apparatus, and states of the main members of the first locking mechanism.

In this condition, when the hand 500A is further operated in the X-axis direction, as illustrated in FIGS. 15A and 15B, the operation of sliding the shutter 740 in the opening direction continues while the retaining portion 740B of the shutter 740 depresses the holding portion 846 downward against the urging force of the compression coil spring 848.

Figure 16A:
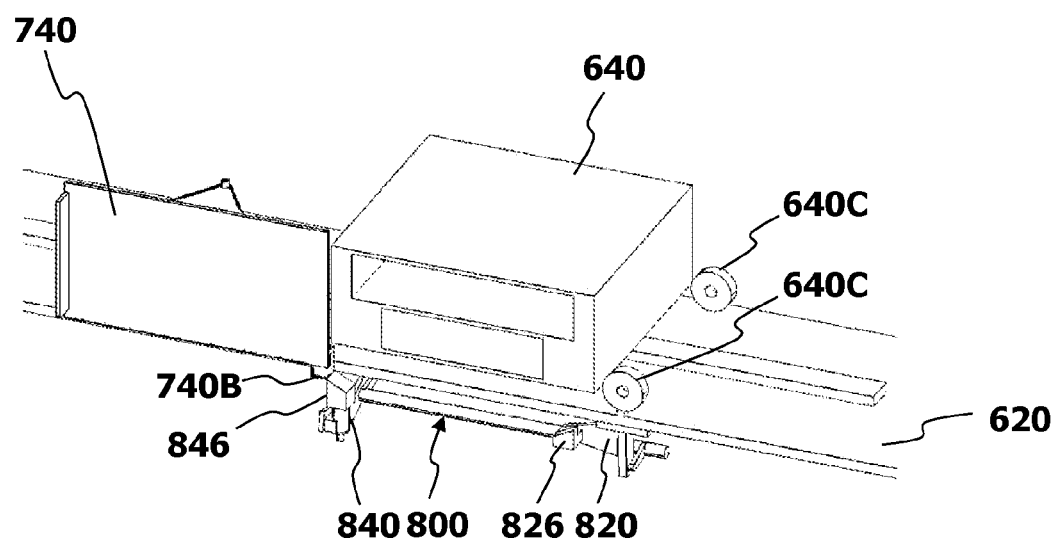
FIG. 16A is a perspective view illustrating a fourth process of the operation of the library apparatus, and states of the transport mechanism and the first locking mechanism.
Figure 16B:
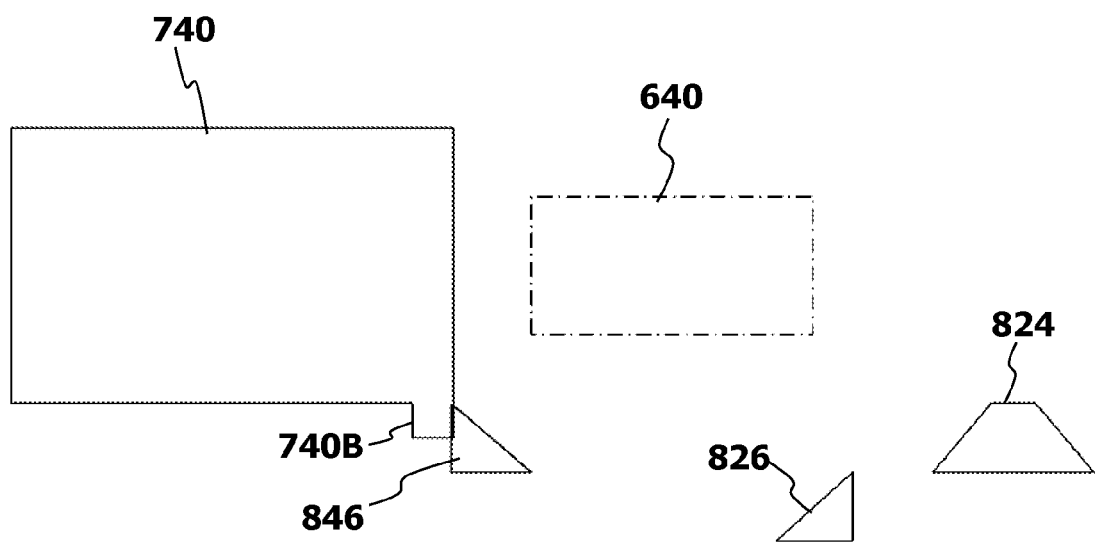
FIG. 16B is a schematic diagram illustrating the fourth process of the operation of the library apparatus, and states of the main members of the first locking mechanism.

When the retaining portion 740B of the shutter 740 crosses over the holding portion 846, as illustrated in FIGS. 16A and 16B, the urging force of the compression coil spring 848 causes the holding portion 846 to move upward, and the holding portion 846 is retained to the retaining portion 740B so that the fully open state of the shutter 740 is maintained. Subsequently, the hand 500A of the robot 500 is moved to a position facing the opening 640A of the cart 640, and a cartridge is passed or received to or from the cart 640.

Figure 17A:
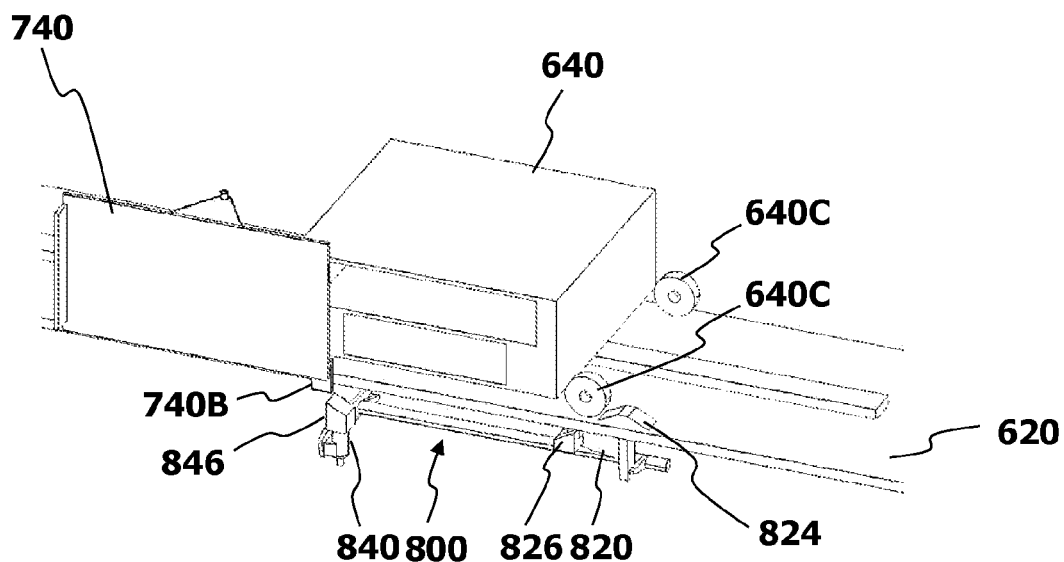
FIG. 17A is a perspective view illustrating a fifth process of the operation of the library apparatus, and states of the transport mechanism and the first locking mechanism.
Figure 17B:
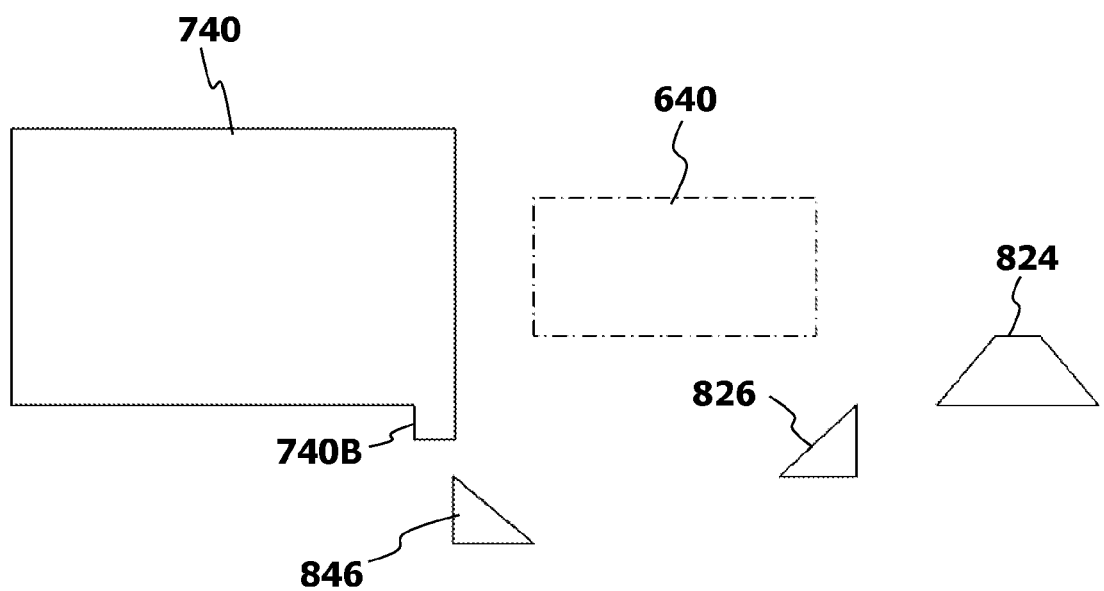
FIG. 17B is a schematic diagram illustrating the fifth process of the operation of the library apparatus, and states of the main members of the first locking mechanism.

When passing or receiving of the cartridge to or from the cart 640 is completed, the cart 640 is moved from the predetermined position as illustrated in FIG. 17A. Then, the urging force of the torsion coil spring 868 causes the first block 820 to move upward and causes the second block 840 to move downward as illustrated in FIG. 17B. When the holding portion 846 moves downward along with the second block 840, the holding portion 846 is released from the retaining portion 740B of the shutter 740, and thus the urging force of the tension coil spring 760 causes the shutter 740 to slide in the closing direction.

When the shutter 740 is in nearly the fully closed state, the retaining portion 740B of the shutter 740 comes into contact with the inclined surface of the lock portion 826 of the first block 820, thereby causing the first block 820 to move downward against the urging force of the torsion coil spring 868.

Figure 18A:
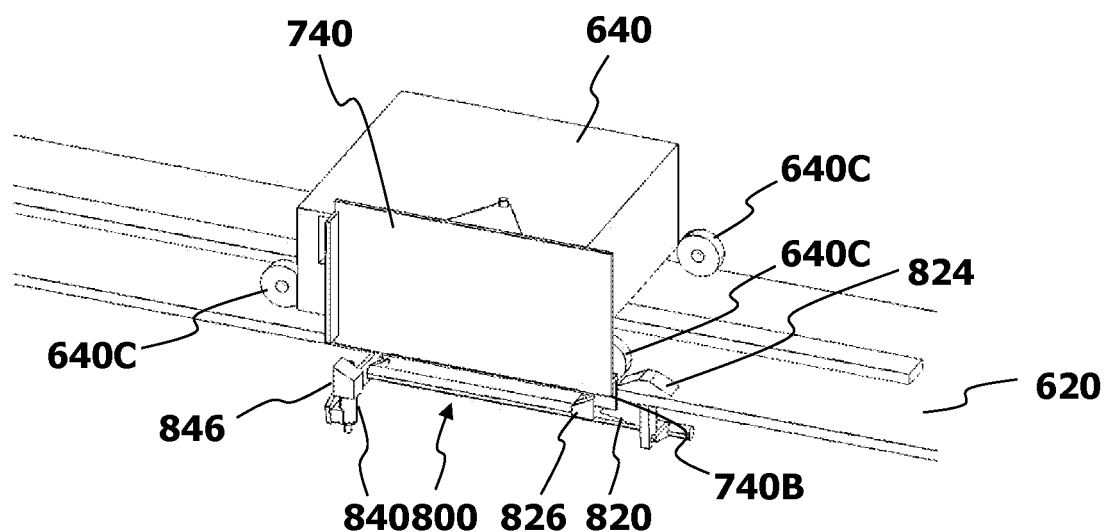
FIG. 18A is a perspective view illustrating a sixth process of the operation of the library apparatus, and states of the transport mechanism and the first locking mechanism.
Figure 18B:
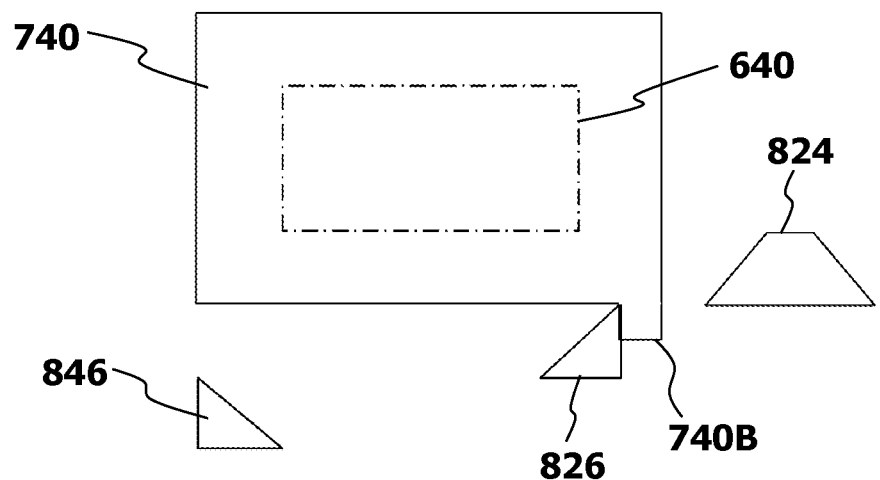
FIG. 18B is a schematic diagram illustrating the sixth process of the operation of the library apparatus, and states of the main members of the first locking mechanism.

When the retaining portion 740B of the shutter 740 crosses over the lock portion 826, the urging force of the torsion coil spring 868 causes the first block 820 to move upward as illustrated in FIGS. 18A and 18B. When the first block 820 moves upward, the lock portion 826 is retained to the retaining portion 740B of the shutter 740 and the fully closed state of the shutter 740 is locked.

Therefore, when the cart 640 of the transport mechanism 600 is not stopped at a predetermined position, the shutter 740 of the shutter mechanism 700 is locked in the fully closed state. Thus, in the case where a failure occurs in an internal device of a cabinet 200 and a worker opens a door to perform maintenance work, even when the worker places a hand on the shutter 740 unconsciously for example, the shutter 740 does not open and thus safety of the worker is secured. In this case, it is sufficient that the cart 640 be not stopped at the predetermined position in the cabinet 200 during maintenance work.

On the other hand, when the cart 640 is stopped at the predetermined position, the shutter 740 in the fully closed state is allowed to slide in the opening direction and the fully open state of the shutter 740 is enabled to be maintained, and thus the function of the transport mechanism 600 is not sacrificed.

Next, a second embodiment for implementing the present disclosure will be described in detail. It is to be noted that the same components as in the first embodiment are denoted by the same symbol.

The library apparatus 100 in the second embodiment has a second locking mechanism that releases locking only when the cart 640 steps on the first block 820 and an operation of lock releasing is performed. In the library apparatus in the embodiment described above, only when the cart 640 passes through the first block 820 and locking is released, a worker is able to manually open the shutter 740 temporarily, the first block 820 serving as a trigger point to release the first locking mechanism 800 of the shutter 740. The library apparatus in the second embodiment avoids a situation in which a worker is able to manually open a shutter 940 temporarily, thereby securing the safety of the worker.

Figure 19:
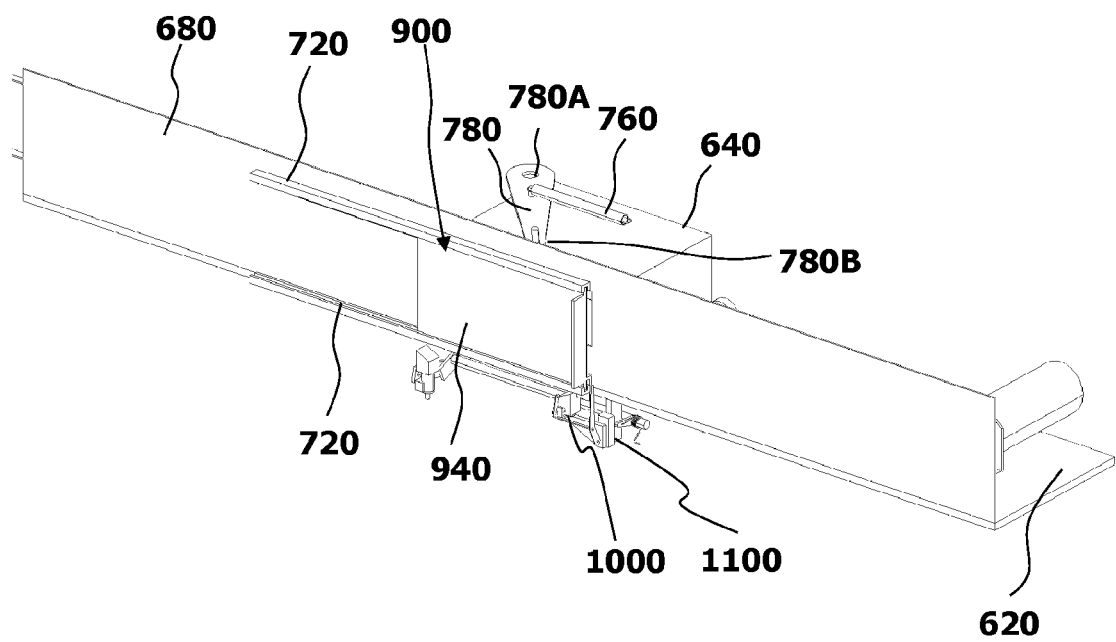
FIG. 19 is a perspective view illustrating an example shutter mechanism.

FIG. 19 illustrates an example shutter mechanism of the library apparatus having the second locking mechanism. As illustrated in FIG. 19, a shutter mechanism 900, which opens and closes the opening 680A, is mounted on the front face of the cover 680. The shutter mechanism 900 includes a pair of upper and lower guide rails 720 that extends in parallel to the longitudinal direction of the cover 680, a shutter 940 that is slidably attached to the pair of upper and lower guide rails 720, and a tension coil spring 760 that urges the shutter 940 in a closing direction.

The shutter 940 is formed of a substantially rectangular plate member and is slidably fitted in a depressed portion of the pair of upper and lower guide rails 720. The shutter 940 includes a projection portion so as to allow the robot 500 to slide the shutter 940 in the opening direction, the projection portion being formed by bending, for example, one longitudinal end of the shutter 940 at a substantially right angle. A substantially rectangular retaining portion is provided integrally with the shutter 940 below the rear side of the one longitudinal end of the shutter 940, the retaining portion straddling over the lower located guide rail 720 and projecting downward to maintain (lock) the shutter 940 in the fully closed state or in the fully open state by a first locking mechanism 1000 and a second locking mechanism 1100, which are described below. It is to be noted that the projection portion may be a handle (knob) that projects from the shutter 940.

The base end 780A of the lever 780, which is formed of a plate member, is mounted on the cover 680 rotatably around a vertically extending rotation shaft. The tip end 780B of the lever 780 has a long hole that extends along a straight line through the rotation shaft, and the projection portion of the shutter 940 is relatively movably pin-connected to the long hole. The tip end of the tension coil spring 760 is fixed to a middle portion of the lever 780. The base end of the tension coil spring 760 is fixed to the cover 680. Therefore, the tension coil spring 760 urges the shutter 940 via the lever 780 in the closing direction all the time, and thus the opening 680A of the cover 680 is not exposed to the outside.

Furthermore, the shutter mechanism 900 is provided with the first locking mechanism 1000 and a second locking mechanism 1100.

Figure 20:
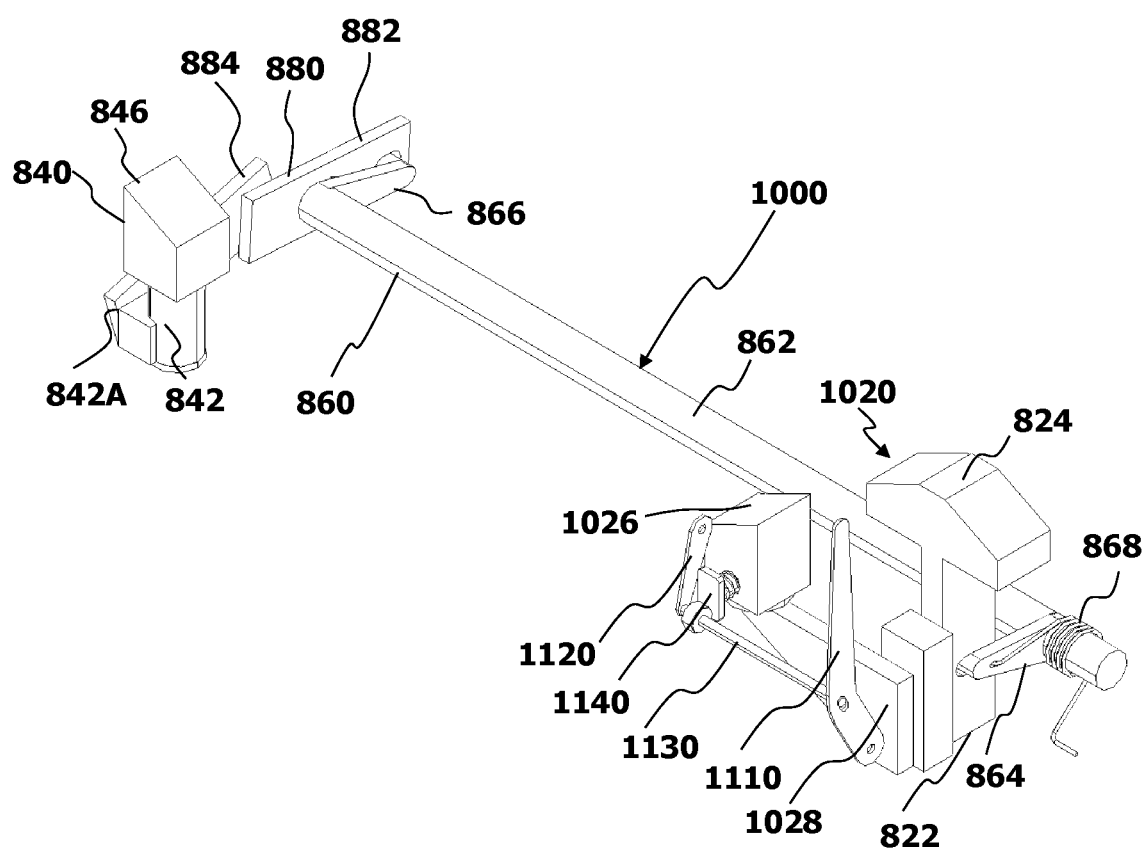
FIG. 20 is a perspective view illustrating example first locking mechanism and second locking mechanism.

Here, FIG. 20 illustrates example first locking mechanism and second locking mechanism.

The first locking mechanism 1000 prohibits or permits sliding of the shutter 940 in the opening direction from the fully closed state according to whether or not the cart 640 of the transport mechanism 600 is stopped at a predetermined position, that is, the position at which the opening 640A of the cart 640 is aligned with the opening 680A of the cover 680. In addition, when the cart 640 is stopped at the predetermined position, the first locking mechanism 1000 enables the fully open state of the shutter 940 to be maintained.

According to whether or not the robot 500 is stopped at a predetermined position, that is, the hand 500A of the robot 500 is stopped at a position immediately before the shutter 940, the second locking mechanism 1100 prohibits or permits sliding of the shutter 940 in the opening direction from a fully closed state after the sliding is permitted by the first locking mechanism 1000 when the cart 640 of the transport mechanism 600 is stopped at a predetermined position, that is, the position at which the opening 640A of the cart 640 is aligned with the opening 680A of the cover 680.

The first locking mechanism 1000 includes a first block 1020 that is depressed by one of the tires 640C of the cart 640, a second block 840 that holds the shutter 940 in the fully open state, a shaft 860 that transmits force for vertically moving the second block 840, and a link 880 that converts motion.

The first block 1020 includes a penetration portion 822 that movably penetrates the base member 620 vertically, a depression portion 824 fixed to the upper end of the penetration portion 822, a lock portion 1026 that is retained to the retaining portion of the shutter 940, and a connection portion 1028 that connects the penetration portion 822 and the lock portion 1026. The lock portion 1026 has a substantially rectangular parallelepiped shape having the upper face that is gradually inclined downward away from the penetration portion 822. The lock portion 1026 is disposed substantially parallel to the front face of the cover 680 of the transport mechanism 600. The connection portion 1028 has a substantially triangular shape in side view and connects the penetration portion 822 and the lock portion 1026. When the cart 640 is stopped at a predetermined position, the depression portion 824 is placed at a position where the depression portion 824 is depressed by one of the four tires 640C. When the shutter 940 is in the fully closed state, the lock portion 1026 is retained to one lateral face of the retaining portion of the shutter 940, and is disposed at a position to lock sliding of the shutter 940 in the opening direction.

The second locking mechanism 1100 includes a lock release lever 1110 that is pressed by the robot 500 in the direction toward the shutter 940 when the robot 500 is stopped at a predetermined position, that is, the hand 500A of the robot 500 is stopped at a position immediately before the shutter 940; a third lever 1120 that is rotatably connected to a predetermined position; a shaft 1130 that connects the lock release lever 1110 and the third lever 1120 and transmits the motion of the lock release lever 1110 to the third lever; and a pressing member 1140 that upon being brought into contact with the shaft 1130 due to pressing of the lock release lever 1110 by the robot 500, penetrates through a lateral face of a lock portion 1026 and comes into contact with a supporting shaft 1029 provided in the lock portion 1026. The second locking mechanism 1100 restricts the operation of the first locking mechanism.

Figure 21A:
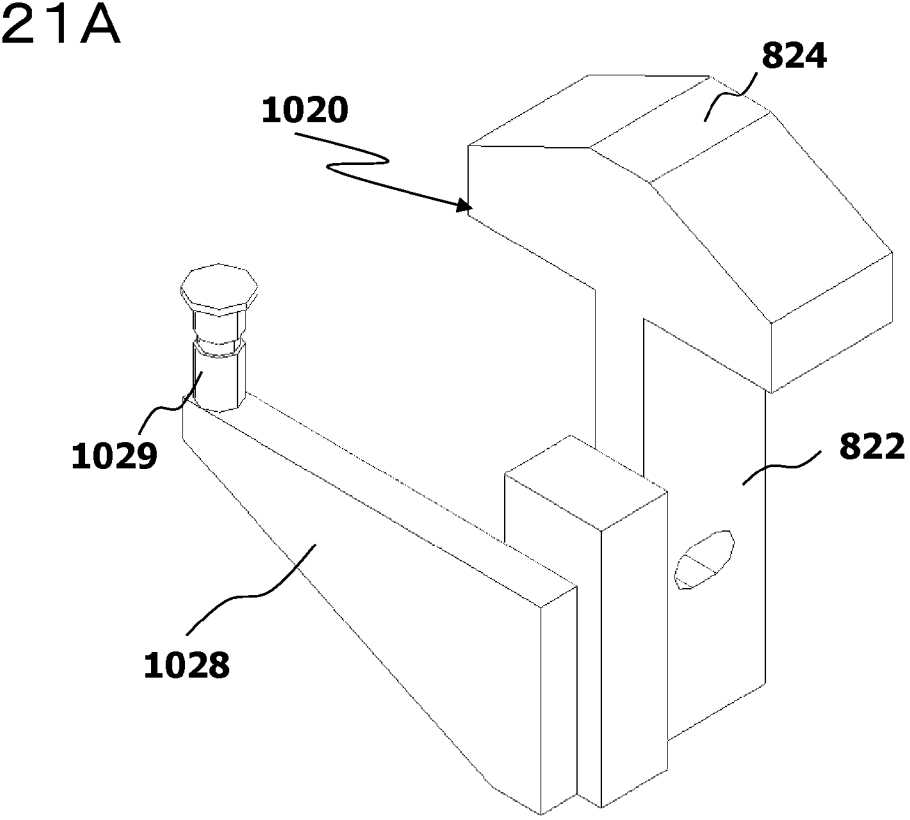
FIG. 21A is a perspective view illustrating an example first block.
Figure 21B:
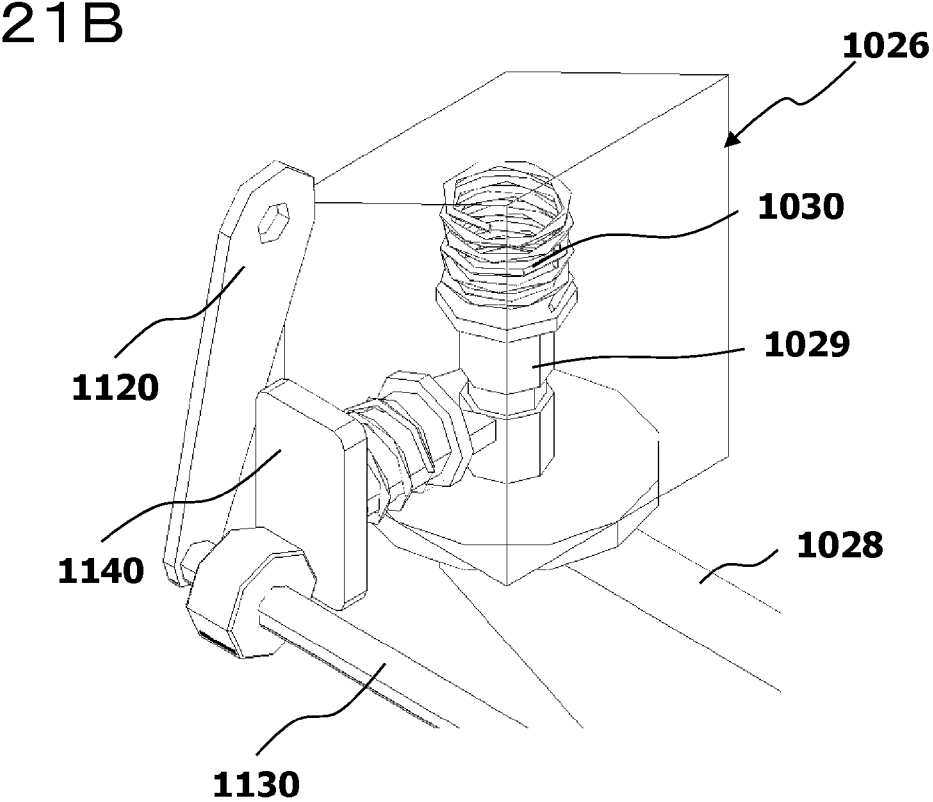
FIG. 21B is a combination diagram of the first block and the second locking mechanism.

FIG. 21A illustrates an example first block. FIG. 21B illustrates a combination diagram of the first block and the second locking mechanism. The first block 1020 has the depression portion 824, the penetration portion 822, the connection portion 1028, and the supporting shaft 1029 at one end of the connection portion 1028. As illustrated in FIG. 21A, the supporting shaft 1029 has a smaller diameter in part of the shaft. As illustrated in FIG. 21B, when the lock portion 1026 is pressed by the pressing member 1140 of the second locking mechanism 1100, the pressing member 1140 is fitted in the part of the supporting shaft 1029 having a smaller diameter. The lock portion 1026 has an internal coil spring 1030 fixed thereto. In the lock portion 1026, the coil spring 1030 is compressed and released by movement of the supporting shaft 1029.

Here, the operation of the first locking mechanism and the second locking mechanism will be described with reference to FIGS. 22A to 24B.

According to whether or not the robot 500 is stopped at a predetermined position, that is, the hand 500A of the robot 500 is stopped at a position immediately before the shutter 940, the second locking mechanism 1100 prohibits or permits sliding of the shutter 940 in the opening direction from a fully closed state after the sliding is permitted by the first locking mechanism 1000 when the cart 640 of the transport mechanism 600 is stopped at a predetermined position, that is, the position at which the opening 640A of the cart 640 is aligned with the opening 680A of the cover 680.

Figure 22A:
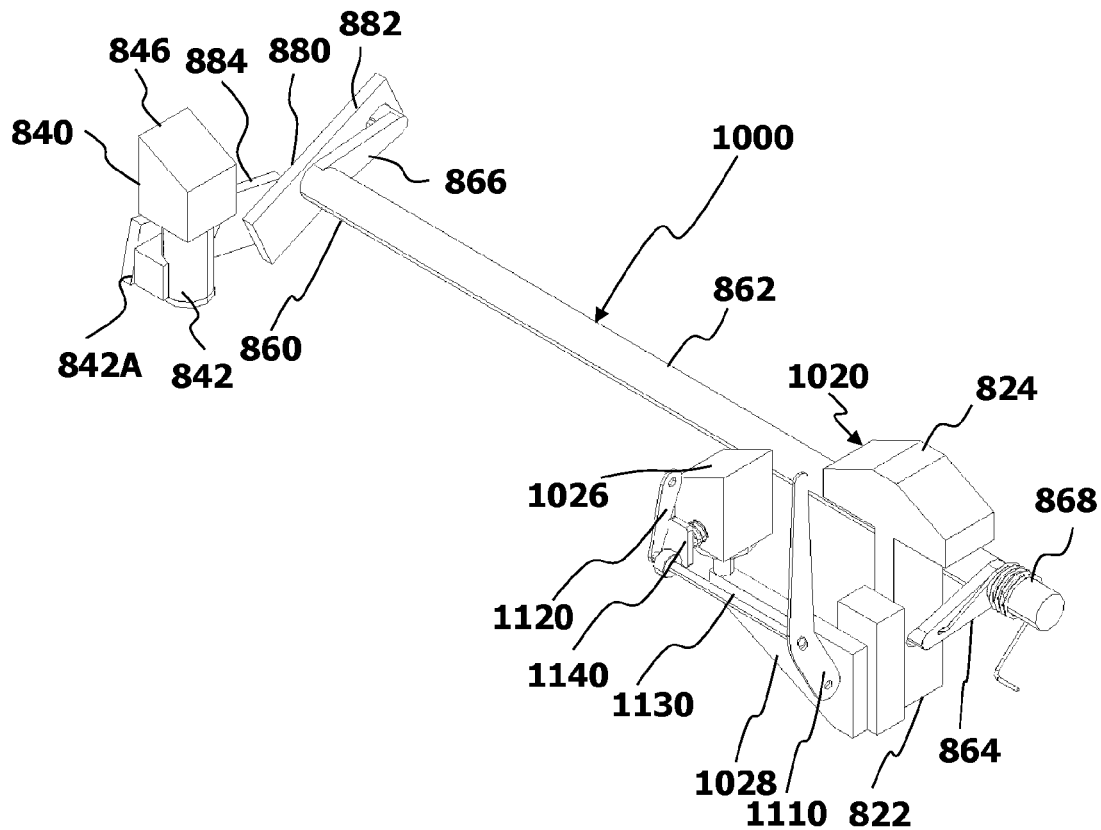
FIG. 22A illustrates a process of the operation of the library apparatus, and is a perspective view for explaining the operation of the first locking mechanism and the second locking mechanism.
Figure 22B:
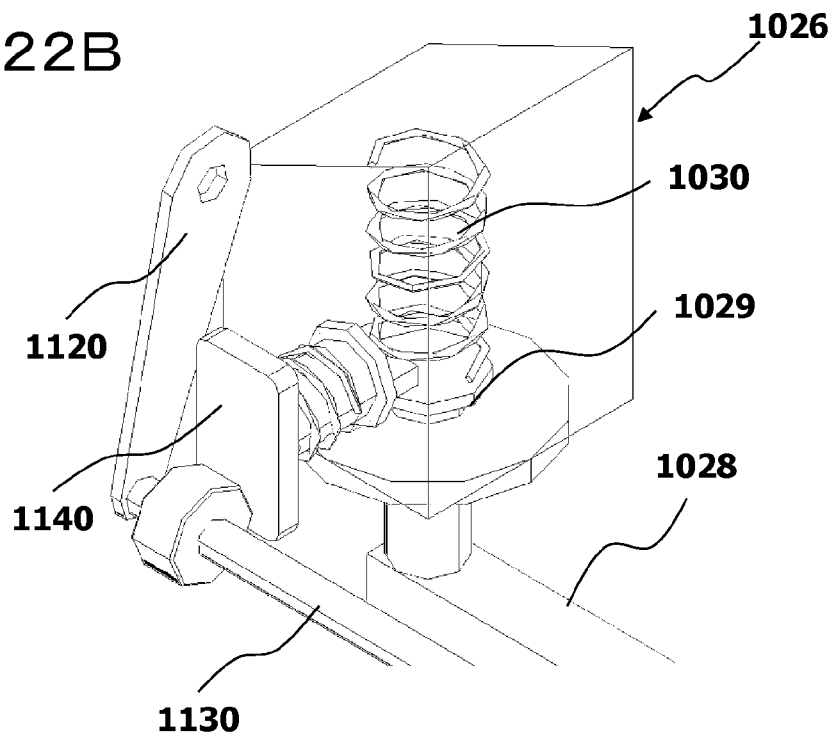
FIG. 22B illustrates a process of the operation of the library apparatus, and is a combination diagram of the first locking mechanism and the second locking mechanism.

FIGS. 22A and 22B illustrate a case where the robot 500 is not at a predetermined position, and FIG. 22A illustrates a perspective view for explaining the operation of the first locking mechanism and the second locking mechanism. FIG. 21B illustrates a combination diagram of the first locking mechanism and the second locking mechanism.

When the cart 640 of the transport mechanism 600 is stopped at a predetermined position, as illustrated in FIG. 22A, one tire 640C of the cart 640 depresses the depression portion 824 of the first block 1020 downward against the urging force of the torsion coil spring 868. When the depression portion 824 is depressed downward, the supporting shaft 1029 of the first block 1020 moves downward. When the robot 500 is not at a predetermined position, the lock release lever 1110 of the second locking mechanism 1100 is not pressed in the direction toward the shutter 940, and thus the pressing member 1140 and the supporting shaft 1029 are not fitted to each other. In this case, even when the depression portion 824 is depressed downward and the supporting shaft 1029 moves downward, the lock portion 1026 is not moved, and thus the lock portion 1026 is not released from the retaining portion of the shutter 940 and sliding of the shutter 940 in the opening direction from the fully closed state is still prohibited.

When the robot 500 is not at a predetermined position and the depression portion 824 of the first block 1020 is depressed downward, the pressing member 1140 is not pressed by the shaft 1130 and thus is not fitted to the supporting shaft 1029 as illustrated in FIG. 22B. Along with the downward movement of the depression portion 824, the supporting shaft 1029 also moves downward. However, the lock portion 1026 is forced to be retained to the retaining portion of the shutter 940 by the coil spring 1030 which is in contact with the supporting shaft 1029. Thus, the library apparatus in the second embodiment avoids a situation in which a worker is able to manually open the shutter 940 when the robot 500 is at a predetermined position, thereby securing the safety of the worker.

Figure 23A:
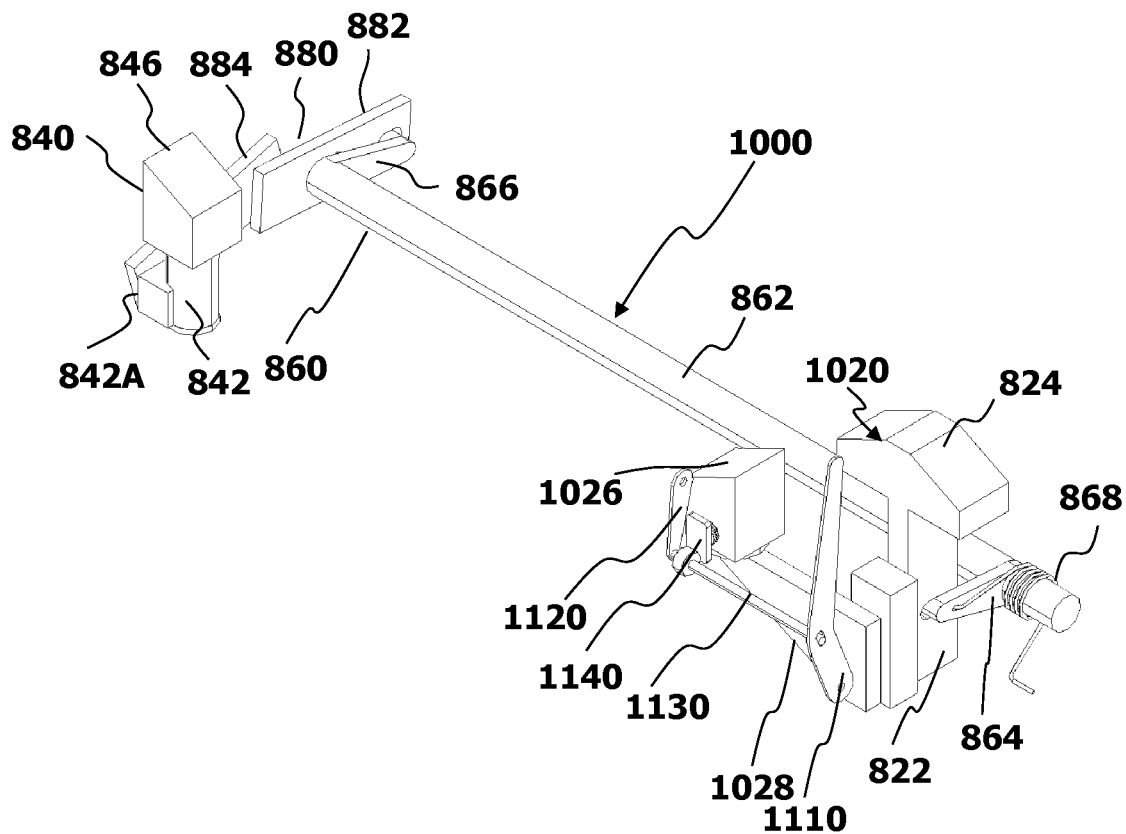
FIG. 23A illustrates a process of the operation of the library apparatus, and is a perspective view for explaining the operation of the first locking mechanism and the second locking mechanism.
Figure 23B:
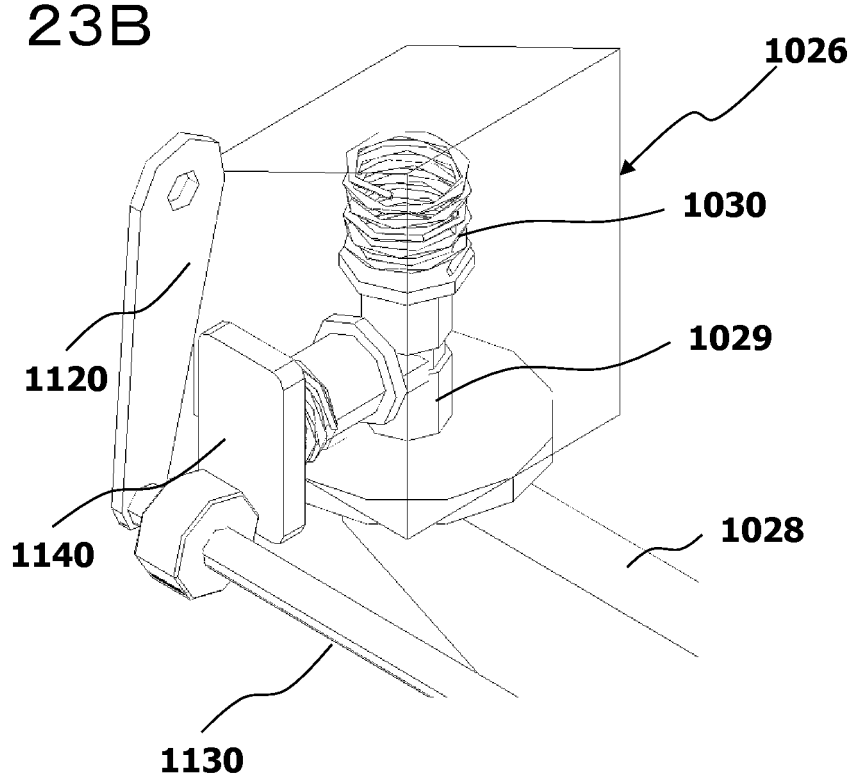
FIG. 23B illustrates a process of the operation of the library apparatus, and is a combination diagram of the first locking mechanism and the second locking mechanism.
Figure 24A:
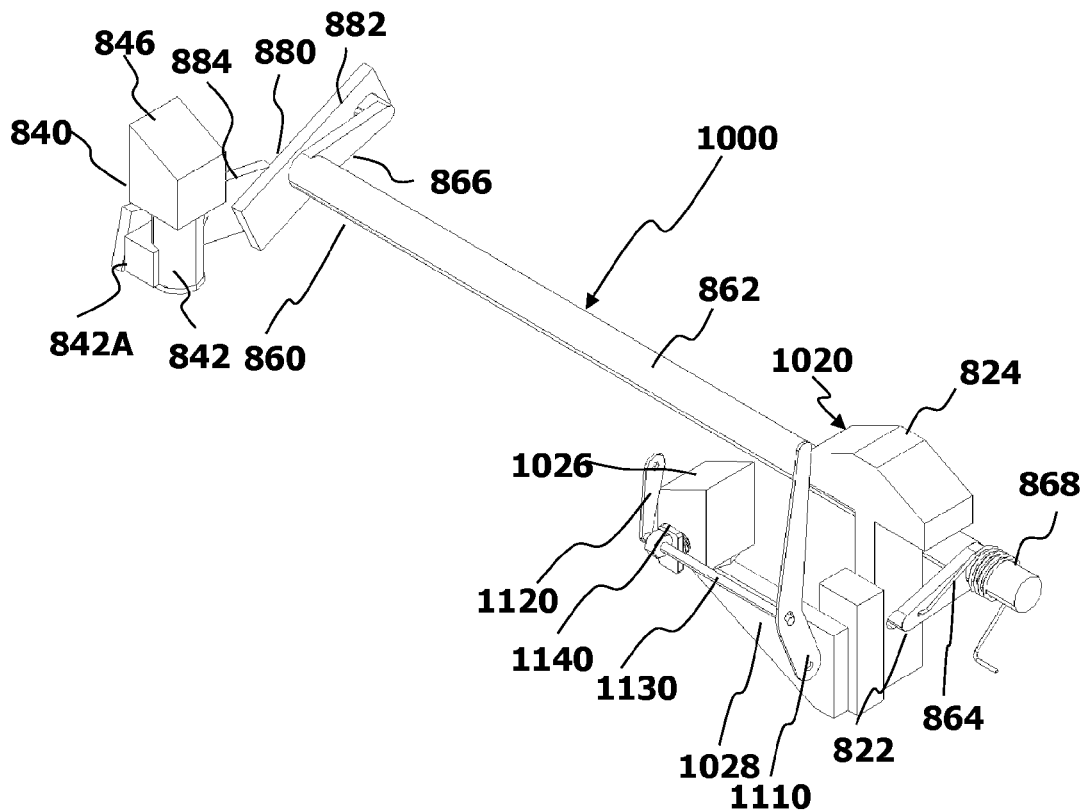
FIG. 24A illustrates a process of the operation of the library apparatus, and is a perspective view for explaining the operation of the first locking mechanism and the second locking mechanism.
Figure 24B:
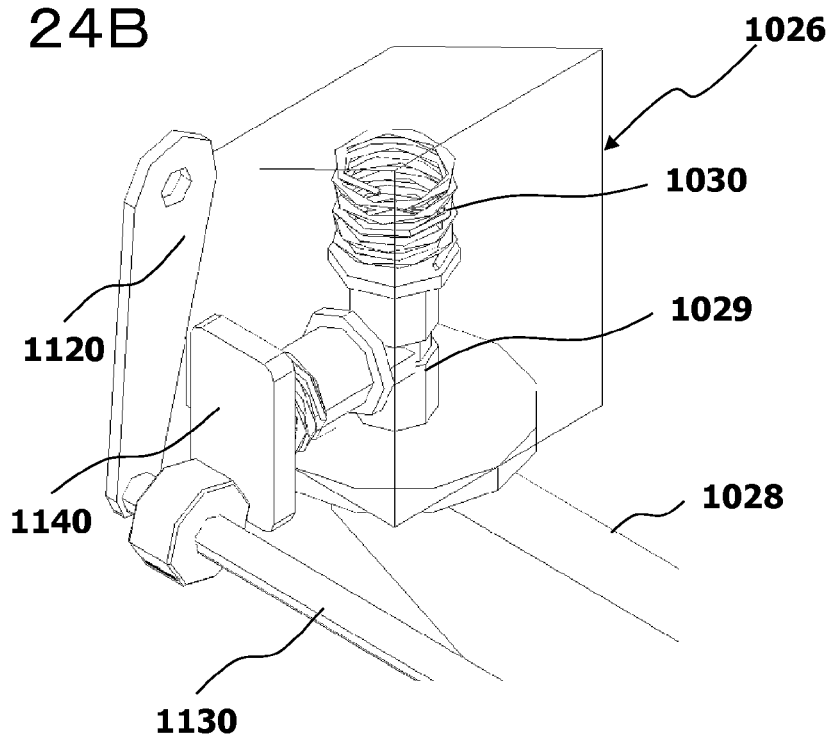
FIG. 24B illustrates a process of the operation of the library apparatus, and is a combination diagram of the first locking mechanism and the second locking mechanism.

FIGS. 23A, 23B and 24A, 24B each illustrate a case where the robot 500 is stopped at a predetermined position, FIGS. 23A and 23B illustrate a case where the cart 640 is not at a predetermined position and FIGS. 24A and 24B illustrate a case where the cart 640 is at the predetermined position. FIGS. 23A and 24A illustrate a perspective view for explaining the operation of the first locking mechanism and the second locking mechanism. FIGS. 23B and 24B illustrate a combination diagram of the first locking mechanism and the second locking mechanism.

In the case where the cart 640 of the transport mechanism 600 is stopped at a predetermined position while the robot 500 is being stopped at a predetermined position, the lock release lever 1110 of the second locking mechanism 1100 is pressed in the direction toward the shutter 940 as illustrated in FIG. 23A. Therefore, as illustrated in FIG. 23B, the pressing member 1140 and the supporting shaft 1029 are fitted to each other.

As illustrated in FIG. 24A, one tire 640C of the cart 640 depresses the depression portion 824 of the first block 1020 downward against the urging force of the torsion coil spring 868. When the depression portion 824 is depressed downward, the supporting shaft 1029 of the first block 1020 moves downward. In this case, when the depression portion 824 is depressed downward and the supporting shaft 1029 moves downward, since the pressing member 1140 and the supporting shaft 1029 are fitted to each other as illustrated in FIG. 23B, the lock portion 1026 moves downward and is released from the retaining portion of shutter 940, thereby releasing the sliding of the shutter 940 in the fully closed state in the opening direction.

Also, when the depression portion 824 is depressed downward, the shaft portion 862 of the shaft 860 rotates in the direction of the arrow via the first lever 864 which is relatively rotatably connected to a lower portion of the penetration portion 822. When the second lever 866 rotates in the direction of the arrow along with the rotation of the shaft portion 862, the first plate member 882 rotates counterclockwise. When the first plate member 882 rotates counterclockwise, the second plate member 884 connected to the tip end of the first plate member 882 rotates clockwise. Then, since the other end of the second plate member 884 is connected to the second block 840, the holding portion 846 moves upward. In this condition, since the upper surface of the holding portion 846 is an inclined surface, along with sliding of the shutter 940 in the opening direction, the retaining portion of the shutter 940 depresses the holding portion 846 downward against the urging force of the compression coil spring 848, and the retaining portion crosses over the holding portion 846. Then, the holding portion 846 is retained to the retaining portion, and the shutter 940 may be maintained in the fully open state.

In this manner, in the case where the shutter 940 in the fully closed state is permitted to slide in the opening direction by the second locking mechanism 1100, when the cart 640 is stopped at a predetermined position, the first locking mechanism 1000 disables the function of locking the shutter 940 in the fully closed state and enables the function of maintaining the shutter 940 in the fully open state. On the other hand, when the cart 640 is moved from the predetermined position, the first locking mechanism 1000 disables the function of maintaining the shutter 940 in the fully open state and enables the function of locking the shutter 940 in the fully closed state.

Next, a third embodiment for implementing the present disclosure will be described in detail. It is to be noted that the same components as in the first or second embodiment are denoted by the same symbol.

The library apparatus in the third embodiment determines an open or closed state of a shutter by reading a label when the shutter is inoperable due to a failure or the like of the shutter, the label being assigned a pattern which is detectable with a camera mounted on the robot.

Figure 25:
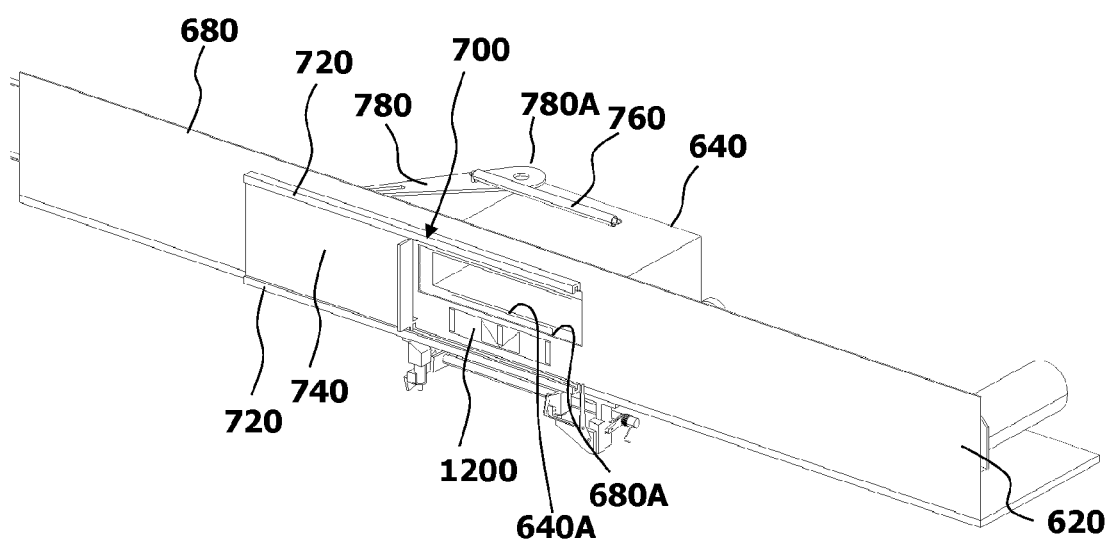
FIG. 25 is a perspective view illustrating an example shutter mechanism.

FIG. 25 is a perspective view illustrating an example shutter mechanism. As illustrated in FIG. 25, a shutter mechanism 700, which opens and closes the opening 680A, is mounted on the front face of the cover 680. Here, a label (pattern label) 1200, which is assigned a pattern detectable with a camera mounted on the robot, is provided at a position which is below the opening 680A and hidden by the shutter 740 in a closed state. The shutter mechanism 700 includes a pair of upper and lower guide rails 720 that extends in parallel to the longitudinal direction of the cover 680, a shutter 740 that is slidably attached to the pair of upper and lower guide rails 720, and a tension coil spring 760 that urges the shutter 740 in a closing direction.

The library apparatus determines an open or closed state of the shutter by reading the pattern label 1200 which is detectable with a camera mounted on the robot.

Figure 26:
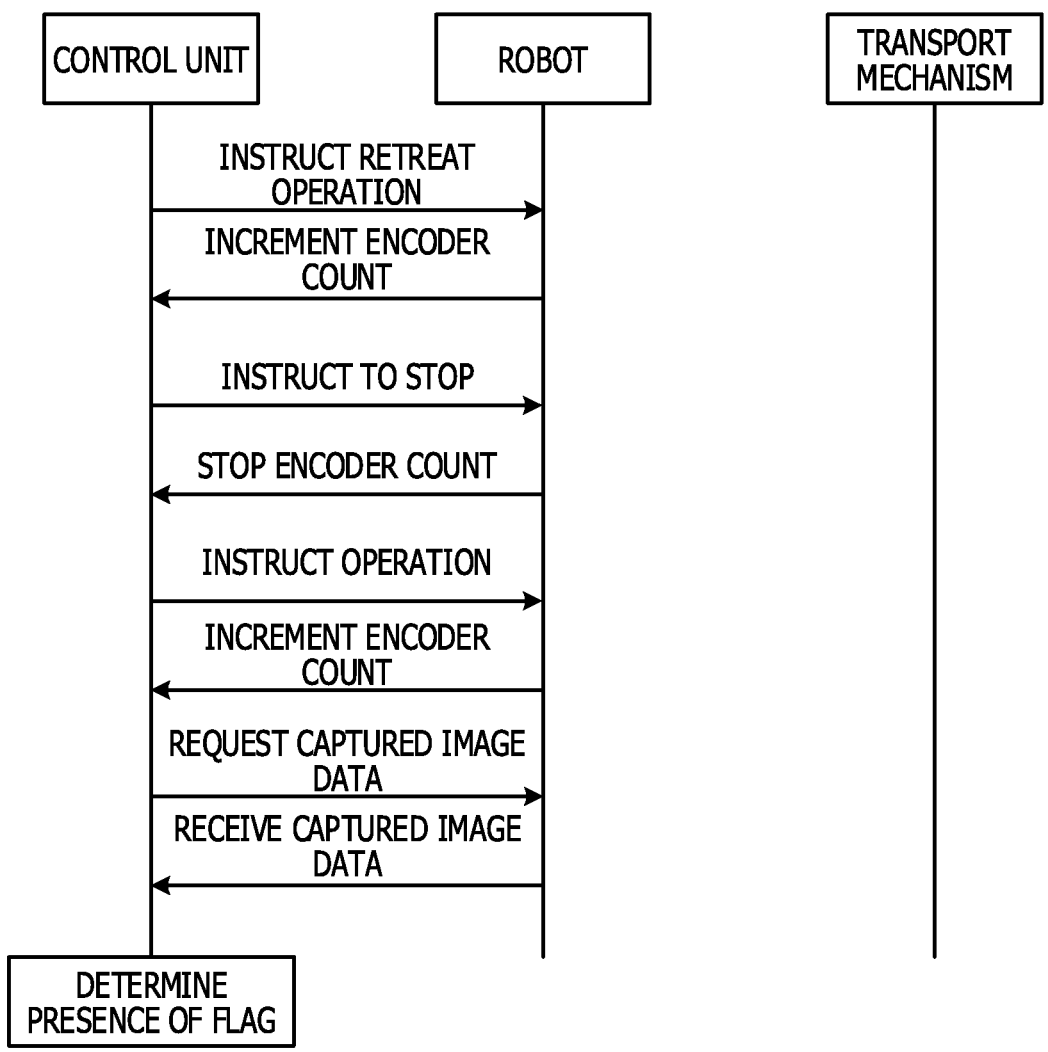
FIG. 26 is a flow of processing of determination of an open or closed state of a shutter.

Here, the processing of determining an open or closed state of the shutter will be described. FIG. 26 illustrates a flow of processing of determination of an open or closed state of the shutter.

The library apparatus controls the operation of the robot and the cart by a control unit. When the robot is stopped at a predetermined position and passing or receiving of a cartridge to or from the cart is completed, the control unit orders the robot to retreat from the shutter, that is, to move in the direction away from the shutter. The robot transmits information on the count of an encoder to the control unit, the count being incremented along with the movement. Based on the transmitted information on the encoder count, the control unit transmits an instruction to the robot to stop when the count of the encoder reaches a predetermined value. Upon receiving the transmitted instruction, the robot stops moving and counting of the encoder.

Next, the control unit transmits an instruction to the cart to move, and receives an encoder count which is associated with the movement of the cart. When the encoder count from the cart reaches a predetermined value, the control unit requests image data captured by a camera from the robot, and receives the captured image data from the robot. The captured image data here covers an area which is near the opening and provided with a pattern label.

The control unit determines whether or not a pattern is detected based on the captured image data. When a pattern is not detected, that is, when the shutter is in a closed state, the control unit determines that the shutter is normal and completes its processing. On the other hand, when a pattern is detected, that is, when the shutter is in an open state, the control unit determines that abnormality has occurred in the shutter and performs processing such as giving an alarm. In this manner, it is possible to reduce the possibility of posing a danger to a worker due to abnormality such as a failure of the shutter.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library apparatus including a plurality of cabinets and a transport mechanism, the cabinets being connected to each other and each housing a robot that handles a cartridge that records data, the transport mechanism being configured to allow the cartridge to be passed or received to or from a running body via an opening formed in a cylindrical path and to be transported between the cabinets, the cylindrical path extending in a direction of the connection of the cabinets, the running body being operable to run along the path, the library apparatus comprising:
a shutter mechanism including a slide-type shutter configured to open and close the opening and an urging member configured to urge the shutter in a closing direction; and
a first locking mechanism configured such that when the running body is stopped at a passing and receiving position of the cartridge, the first locking mechanism permits the shutter in a fully closed state to slide in an opening direction and enables a fully open state of the shutter to be maintained, whereas when the running body is not stopped at the passing and receiving position of the cartridge, the first locking mechanism releases the maintenance of the fully open state of the shutter and prohibits the shutter in the fully closed state from sliding in the opening direction.

2. The library apparatus according to claim 1,
wherein the shutter includes a projection portion configured to be held by a hand of one of the robots.

3. The library apparatus according to claim 1,
wherein the first locking mechanism is configured such that when the running body is stopped at the passing and receiving position of the cartridge, a first block, which locks the shutter in the fully closed state, moves downward to permit the shutter in the fully closed state to slide in an opening direction, and a second block moves upward along with the downward movement of the first block to enable the fully open state of the shutter to be maintained.

4. The library apparatus according to claim 3,
wherein each of the first block and the second block is urged upward by an urging member.

5. The library apparatus according to claim 3,
wherein the first block and the second block are connected by a mechanical link mechanism.

6. The library apparatus according to claim 1,
wherein the first locking mechanism is configured such that when the running body is not stopped at the passing and receiving position of the cartridge, the first block moves upward to prohibit the shutter in the fully closed state from sliding in the opening direction, and the second block moves downward along with the upward movement of the first block to release the maintenance of the fully open state of the shutter.

7. The library apparatus according to claim 1,
wherein when the running body is stopped at the passing and receiving position of the cartridge, the robot slides the shutter from the fully closed state to the fully open state.

8. The library apparatus according to claim 1, further comprising
a second locking mechanism configured such that when the robot is located at a predetermined position with respect to the opening, the second locking mechanism permits an operation of the first locking mechanism, whereas when the robot is not located at the predetermined position with respect to the opening, the second locking mechanism prohibits the operation of the first locking mechanism.

9. The library apparatus according to claim 1, further comprising
a control unit configured to determine that the shutter is open by reading a label with an image capturing unit mounted on the robot, the label being provided on a periphery of the opening, at a position opposed to the robot, when the robot is located at a position facing the opening.

* * * * *